(12) United States Patent
Steinke et al.

(10) Patent No.: US 7,399,172 B2
(45) Date of Patent: Jul. 15, 2008

(54) APPARATUS FOR VACUUM FORMING AN ELASTOMERIC TIRE

(75) Inventors: Richard A. Steinke, Boulder City, NV (US); Theodore M. Love, Las Vegas, NV (US); James G. Moore, Boulder City, NV (US)

(73) Assignee: Amerityre, Boulder City, Novad ( * ) Notice: Subject to any disclaimer, the term of this patent is extended or adjusted under 35 U.S.C. 154(b) by 412 days.

(21) Appl. No.: 10/936,635

(22) Filed: Sep. 4, 2004

(65) Prior Publication Data

US 2006/0049546 A1    Mar. 9, 2006

(51) Int. Cl.
   *B29C 33/00* (2006.01)
(52) U.S. Cl. .................. 425/35; 152/452; 156/125; 425/28.1; 425/546; 425/562
(58) Field of Classification Search .............. 425/28.1, 425/35, 49, 117, 128, 129.1, 546, 557, 562, 425/564; 152/452; 156/125, 394.1; 264/279, 264/279.1, 328.3
See application file for complete search history.

(56) References Cited

U.S. PATENT DOCUMENTS

| | | | |
|---|---|---|---|
| 3,200,180 A * | 8/1965 | Russ et al. ................. | 425/582 |
| 4,272,309 A * | 6/1981 | Payne et al. ................ | 156/125 |
| 4,287,930 A * | 9/1981 | McIntosh et al. ............ | 156/125 |
| 4,573,894 A | 3/1986 | Blayne et al. | |
| 5,152,951 A | 10/1992 | Ahmad et al. | |

* cited by examiner

*Primary Examiner*—Geoffrey L Knable
(74) *Attorney, Agent, or Firm*—M. Reid Russell

(57) ABSTRACT

A vacuum forming apparatus and process for its use in forming a transport tire from an elastomeric material that includes a mold having a cavity or annular area wherein a transport tire core of plies, belt and beads is laid-up on a mandrel located within the mold. The mold receives a cover fitted in sealing engagement over the mold top and a cylindrical canister is fitted through the center of which cover and the mold center that is open at a top end to receive a pour of an elastomeric material mixture and includes a needle valve in its lower end that exhausts into one end of the mold annular area. The cylindrical canister includes a port for connection to a deep vacuum source and the cover includes a port that is for connection to a low level vacuum source, with the deep vacuum to remove air from the elastomeric material mixture as it is poured into the canister, and with, after filling, the port is open to atmosphere and the needle valve is opened to exhaust the mixture into the mold annular chamber wherethrough it is pulled by the low level vacuum through the cover port, filling the mold annular cavity and thoroughly impregnating the core maintained therein.

8 Claims, 26 Drawing Sheets

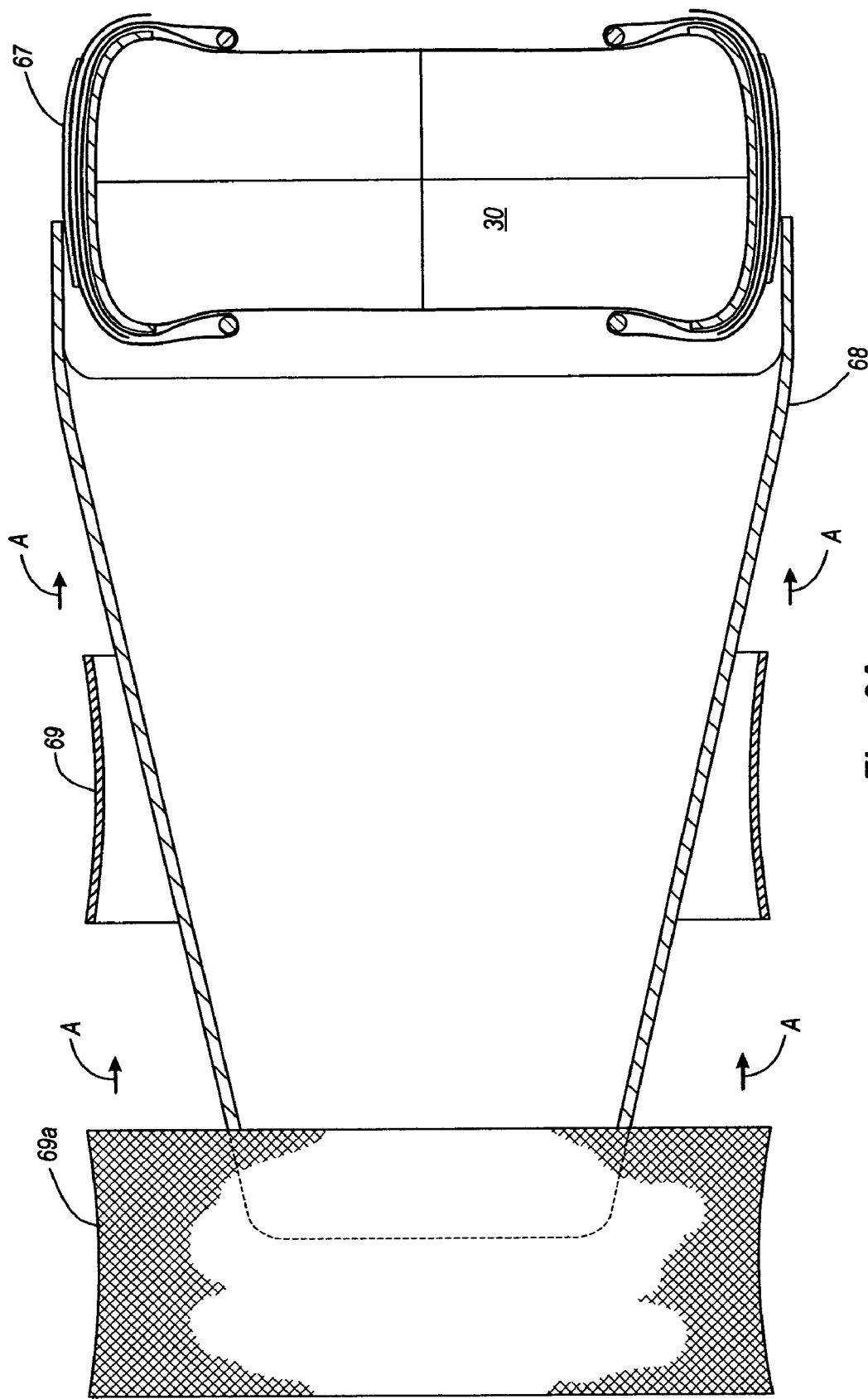

APPARATUS FOR VACUUM FORMING AN ELASTOMERIC TIRE

BACKGROUND OF INVENTION

1. Field of the Invention

This invention pertains to methods and apparatus for vacuum forming an elastomeric transport tire containing a core of belts, plies and beads.

2. Prior Art

The present invention is in a new and unique vacuum forming apparatus for use in an automated method for forming a transport tire from an elastomeric material that includes a core of optimally positioned belts, plies and beads, to provide a balanced transport tire.

Heretofore it was recognized that venting air from a tire tread mold cavity early in a casting process could eliminate the necessity for venting the cavity through spaced holes in the mold that materials from the tread flowed into during casting and formed projections or "tits". Such extensions or "tits" projected from the tread surface and were either pulled off when the tire was removed from the mold, had to be cut off or wore off during tire use. To prevent this undesirable cosmetic anomaly it was recognized that air could be vented from the mold cavity just before tread casting, eliminating a necessity for providing flow passages or vents from the tire tread mold while still obtaining a smooth, un-pocketed or un-blemished, finished tread surface. Examples of such an introduction of a vacuum into a tire mold just prior to forming a tire tread are shown in U.S. Pat. Nos. 4,573,894 and 5,152,951.

U.S. Pat. No. 4,573,394 sets out a tire mold having a cavity that is for receiving and finally shaping the tire. The patent is defined by a surface that is for contacting the exterior of the tire during tire curing. The cavity is fluid connected to a single vacuum source for evacuating air from within the cavity during an early portion of a tire curing cycle to prevent air and any other fluid from becoming trapped between the tire and the surface that defines the cavity that will become the tire tread. Visual effects in the form of voids in the tire exterior are, thus eliminated.

Like the '894 patent, U.S. Pat. No. 5,152,951 also provides for the elimination of fluid from the mold cavity during an early portion of a tire curing cycle. The patent provides for fluid evacuation through a space between the surfaces of the mold parts that defines the mold parting line region. Both patents provide a single vacuum source and its connection to the mold cavity for forming the tire side wall and tread surfaces. Whereas, the present invention provides for both an evacuation of air from the elastomeric mixture prior to its introduction into the mold cavity, and for pulling the air free mixture through the mold. With that flow filling the area between inner and outer mold walls, traveling through the core of plies, belts and beads, to form a finished transport tire that is free of voids or pockets.

A core of plies, belts and beads for use in the vacuum forming apparatus of the invention is set out in a U.S. patent Application for a "Tire Core Package for Use in Manufacturing a Tire With Belts, Plies and Beads and Process of Tire Manufacture" Ser. No. 10/143,678, filed May 13, 2002, of two of the inventor, and is presently pending. This patent application sets out a process, utilizing a sandwich of pre-cured elastomer layers between layers of plies and belts formed over a mandrel for fitting into a mold, for forming a tire utilizing a spin casting method. Also, one of the inventors of the present application is the sole inventor of a U.S. patent Application for an "Elastomeric Tire With Arch Shaped Shoulders" filed May 28, 2004, assigned Ser. No. 10/856,652.

The present invention is a new approach to forming a transport tire from an elastomeric material from earlier patent applications for spin casting apparatus and methods for use in such spin casting apparatus for forming a transport tire that are shown and discussed in a recently filed U.S. patent Applications of two of the inventors, entitled, "Method and Apparatus for Forming a Core of Plies, Belts and Beads and For Positioning the Core in a Mold For Forming an Elastomeric Tire and the Formed Elastomeric Tire", filed Jun. 4, 2004, Assigned Ser. No. 10/860,997, and an "Improved Method and Apparatus for Forming a Core of Plies, Belts and Beads and for Positioning the Core in a Mold for Forming an Elastomeric Tire", filed Aug. 2, 2004, assigned Ser. No. 10/809/807. All of which earlier patents are directed to spin casting methods and apparatus and do not involve a vacuum forming apparatus and method as does the present invention.

SUMMARY OF THE INVENTION

It is a principal object of the present invention to provide a vacuum forming apparatus and method for its use for forming a transport tire containing a core of plies, belts and beads encapsulated therein that are optimally positioned to provide essentially a perfectly balanced tire.

Another object of the present invention is to provide a vacuum apparatus for forming an elastomeric tire with a core of plies, belts and beads is encapsulated therein in a single operation, where air is removed from the elastomeric material mixture prior to its passage into the mold and the elastomeric material is pulled, under vacuum, through the mold, filling essentially all the voids in, between and through the core layers to form a homogenous tire where the core of plies, belts and beads is optimally positioned therein.

Another object of the present invention is to provide a vacuum casting apparatus that includes a canister that is initially placed under a deep vacuum as it receives a volume of mixed elastomer constituents, with the vacuum pulling air from the mixture, and whereafter the canister is opened to atmosphere and the column of the air-free mixture is allowed to pass through a canister exhaust valve and travel into a mold cavity that is at a low-level vacuum, wherein a core of plies, belts and beads is maintained in a cavity between inner and outer mold surfaces, with the low level vacuum pulling the air-free mixture across the core, filling the mold cavity, and is allowed to cure into a homogeneous finished tire.

Another object of the present invention is to provide a mold with a cavity as a component of a vacuum forming apparatus with a reservoir that connects to a vacuum source that is opened at a top end to receive a mix of elastomeric material constituents and is subjected to a deep vacuum that draws the air from the mixture in preparation for its passage through a vent valve into the mold cavity that is under a low-level vacuum.

Another object of the present invention is to provide for connection of the reservoir canister with the mold annular area that contains a mandrel whereon a tire core of plies, belts and beads with separators has been laid up and crowned by a wrap of tire cord, with the mold cavity is under a low-level vacuum, and the reservoir canister is under a deep vacuum such that air trapped in an elastomeric mix pour therein is removed and, when the canister valve is opened, the air-free elastomeric material mix is pulled into the mold cavity, traveling through and across, to fully encapsulate, the tire core, forming a homogenous tire.

Another object of the present invention is to provide a vacuum forming apparatus where a core of tire belts, plies and beads will be encapsulated at an optimum position in a finished tire to provide a near perfectly balanced finished tire.

Still another object of the present invention is to provide a vacuum forming apparatus for manufacturing an elastomeric tire where, in the formation process, essentially all air is removed from the elastomeric material mixture before its passage into a mold wherethrough the material is pulled, under a low level vacuum, to completely permeate through and around a core of plies, belts and beads and spacers maintained in the mold cavity, forming, in a single molding operation, a tire that is ready for removal from the mold after cooling.

Still another object of the present invention is to provide, a mandrel whereon a core of plies, belts and beads with spacer is laid up, for fitting in the vacuum forming apparatus that includes a canister to receive a mixture of elastomeric material constituents for connection to a vacuum source to provide a deep vacuum in the canister that removes trapped air from elastomeric mixture, with the air-free mixture then passed through a valve into the mold cavity that is connected to a low level vacuum that pulls the mixture through the tire, forming a transport tire.

Still another object of the present invention is to provide for seals for maintaining canister and mold integrity when they are subjected, respectively, to a deep vacuum and a low level vacuum.

Still another object of the present invention is to provide a vacuum forming apparatus for casting a transport tire containing a core of plies, belts and beads in a single operation, producing a homogenous tire that is essentially perfectly balanced.

The present invention is in a vacuum forming apparatus that receives a mold arranged therewith that includes of an inner mold that maintains a mandrel whereon is built-up a core of plies, belts and beads with spacers or separators therebetween. Which inner mold mandrel is for fitting into an outer mold whose annular surface has the shape of the outer surface of a transport tire, and which outer mold is easily opened to allow for removal of a tire formed therein. A mold canister is provided that is to receive a mix of elastomeric constituents and connects to a deep vacuum source for removing air from which mix. With, after air removal, the mix is passed through a needle valve into an annular area between the inner mold mandrel and the outer mold that is under a low level vacuum that pulls the mix through the mold. The elastomeric material mix is passed through and around to encapsulate the tire core. Seals are provided within the apparatus, between a cover and outer mold top, around the mold body, and at the canister, to contain both the deep and low level vacuums that are preferably generated by separate vacuum sources.

Upon receipt of a set volume of the elastomeric material mix the canister is sealed and is subjected to a deep vacuum. The vacuum is pulled through a port in the canister, and is operated until the mix in the canister is essentially free of all the air that had been trapped therein during the mixing process. Thereafter, with the mold maintained under a low level vacuum that is pulled through a port in the cover, the canister is opened through a needle valve and is open to outside air, and vents into the mold annular or hub area, pulling the air free elastomeric mix therein by the low level vacuum. The mix passes through and around the core, thoroughly penetrating and bonding to all the core constituent threads and cords, with any air in the mold traveling ahead of the mix flow to the cover port wherethrough the low level vacuum is being pulled. In practice, the needle valve is required to be closed before the canister is empty and comes under ambient air conditions as are present in the canister. After cooling, the mold is broken open and a completed transport tire containing perfectly positioned core of plies, belts and beads, is removed therefrom.

In a practice of the method, utilizing the apparatus of the invention, for forming, in a single operation, a transport tire includes: passing a volume of mixed elastomeric material constituents into a mold canister that is preferably, but may not necessarily be, centered in the mold that includes inner and outer mold components, and is easily opened after casting for removal of a finished transport tire. With the inner mold to function as, or includes a mandrel portion, whereon a core of plie, belts and beads, with spacer or separators therebetween, has been laid-up thereon, and the annular inner surface of the outer mold has a tire tread pattern embossed therearound.

DESCRIPTION OF THE DRAWINGS

The invention may take physical form in certain parts and arrangement of parts, used to form the apparatus of and practice the steps of the invention that are herein shown as a preferred embodiment and will be described in detail in this specification and illustrated in the accompanying drawings which form a part hereof:

FIG. 6A shows a top plan view like that of FIG. 4B except that the expander cone is shown fitted over the hard core assembly whereon the plies and beads have been assembled, and a separator, that is a layer of cotton batting, as having been applied therearound, and showing a first belt sleeve fitted onto the expander cone and a second belt sleeve, that is shown as a weave formed from crossing sections of belt cord, aligned with the expander cone smaller end and showing, with arrows A, the belt sleeve traveling up the expander core;

DETAILED DESCRIPTION

Figure 11:
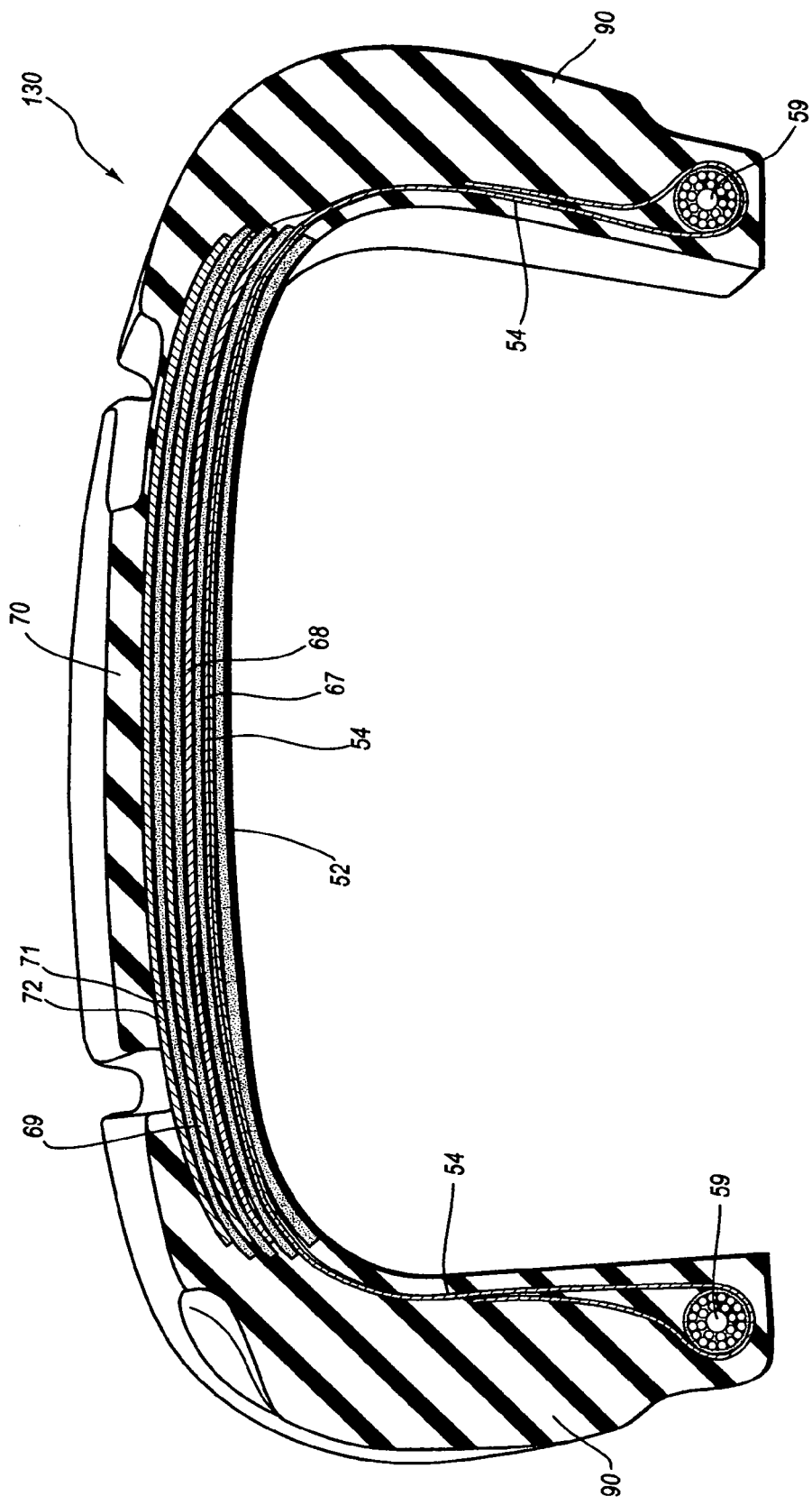
FIG. 11 shows an assembled view of the tire of FIG. 10.

The invention is in a process and apparatus for forming a transport tire with vacuum forming apparatus 90 of the invention, wherein a core of belts, plies and beads is optimumally positioned, forming a transport tire that is like the tire 130 of FIG. 11. The vacuum forming apparatus 90, like earlier spin casting processes and apparatus such as those of the inventors identified hereinabove in the Prior Art section of the present application, provides for forming, in a single operation, an essentially perfectly balanced transport tire containing plies, belts and beads, with the tire then pulled from the mold.

Like earlier spin casting apparatus and methods of manufacture for practice thereon, as set out in the Prior Art section of the present application, the vacuum forming apparatus of the invention, as herein shown in FIGS. 8E and 9A through 9D, employs a mold containing a mandrel in its cavity portion whereon is laid up a core of plies, belts and beads with separators fitted therebetween. One such arrangement of a mandrel as the outer surface of an inner mold that is used to lay up thereon a core of plies, belts and beads is set out in FIGS. 1, 2A, 2B, 3A, 3B, 4A through 4C, 5A through 5F, 6A, 6B, and 7A through 7C. With a final core formed on the inner mold mandrel shown in FIG. 8A, and with an outer mold for containing the inner mold shown assembled in FIGS. 8B through 8D. It should, however, be understood that the inner mold with its mandrel portion and outer mold arrangements can be varied, and other mold arrangements can be substituted therefore, within the scope of this disclosure, to operate with the vacuum forming apparatus 90 of the invention, as set out in FIGS. 8E, and 9A through 9D to manufacture a transport tire that is like the tire 130, as shown in FIG. 11.

Figure 1:
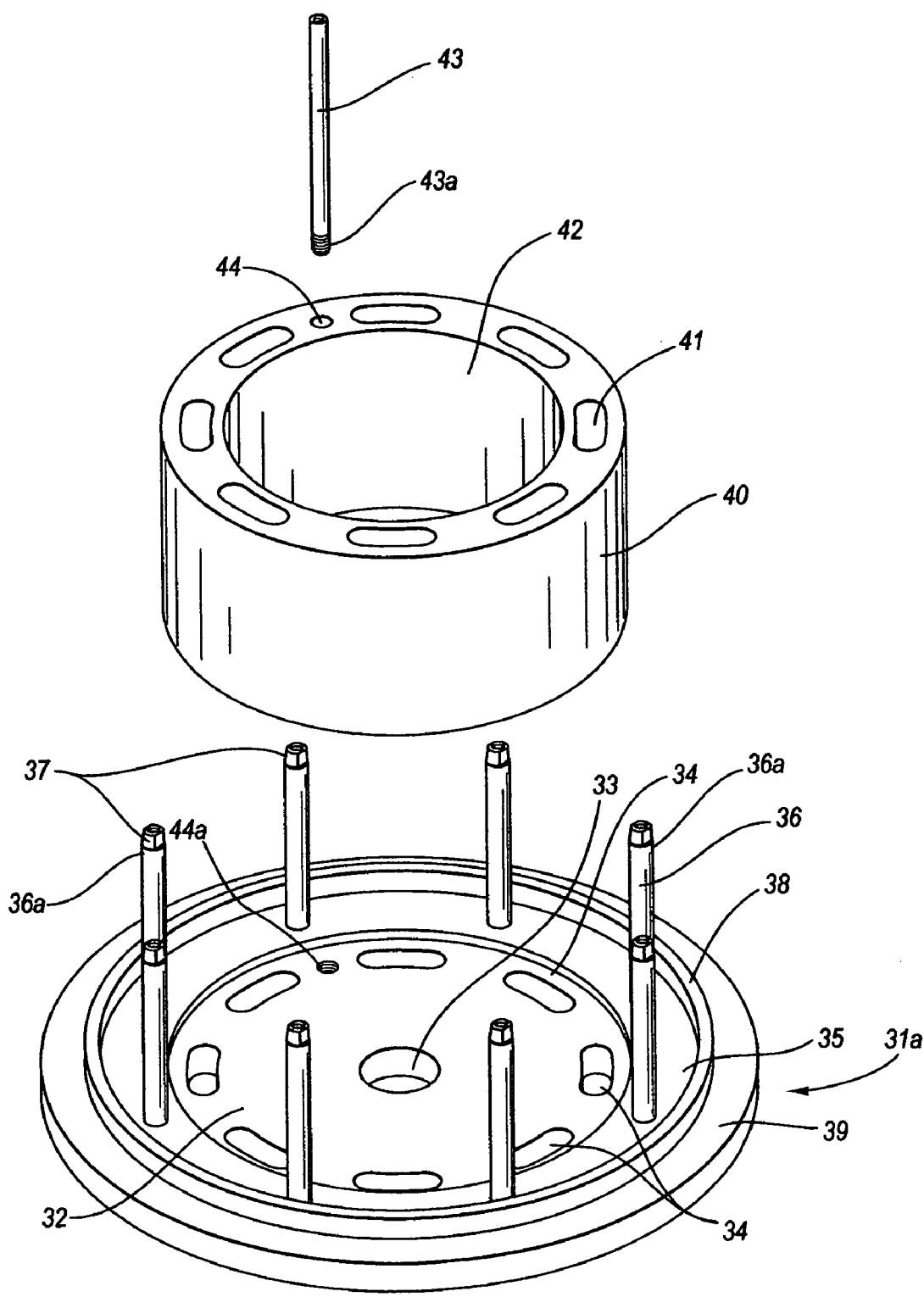
FIG. 1 shows an exploded perspective view taken from above a bottom hub plate whereto a cylindrical hub manifold is being fitted with studs turned into the bottom hub plate, forming an inner mold for use with the apparatus of the invention, practicing the process of the invention.
Figure 2A:
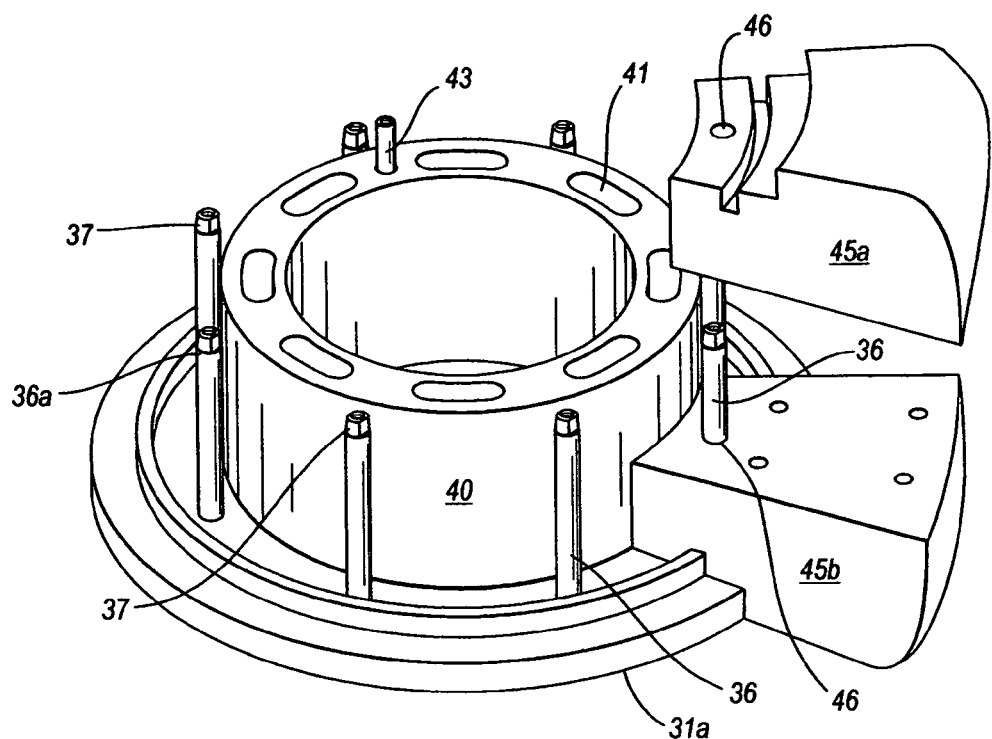
FIG. 2A shows the inner mold components of FIG. 1 receiving a pair of hard foam core segments fitted over the studs.
Figure 2B:
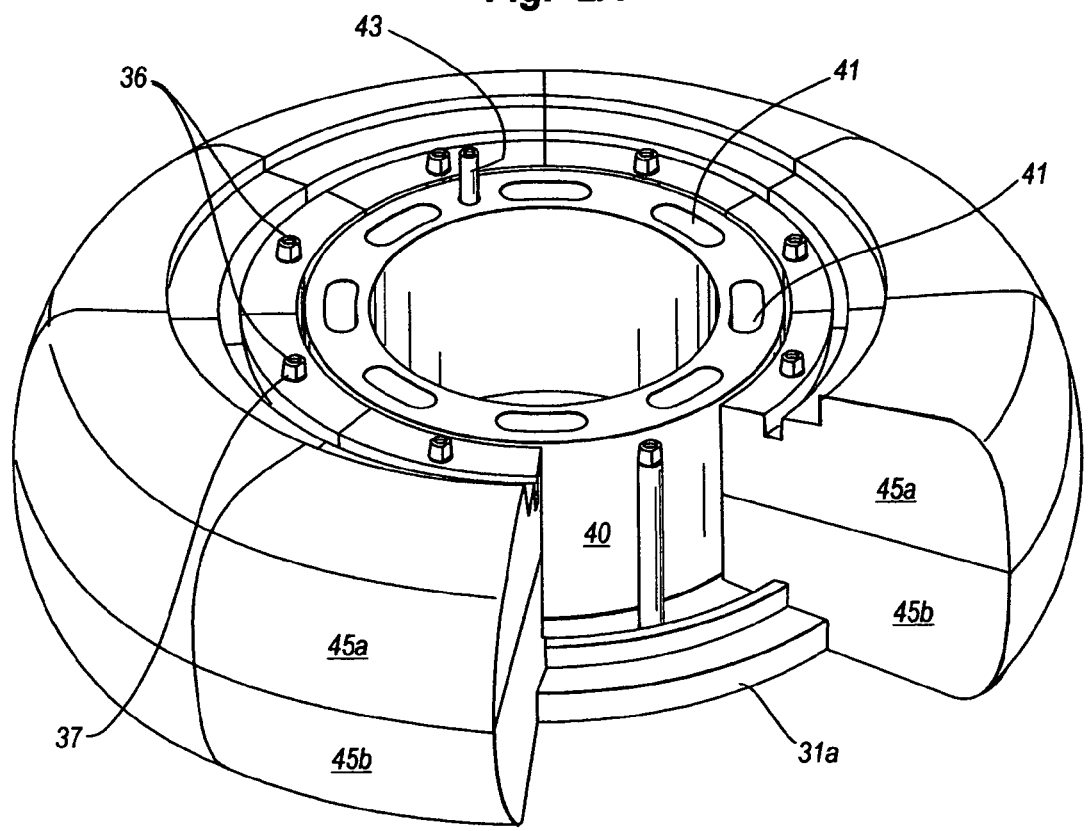
FIG. 2B shows all but a pair of the hard foam core segments assembled to the bottom hub as a mandrel for receiving a core of plies, belts and beads for a transport tire core laid-up thereon.
Figure 3A:
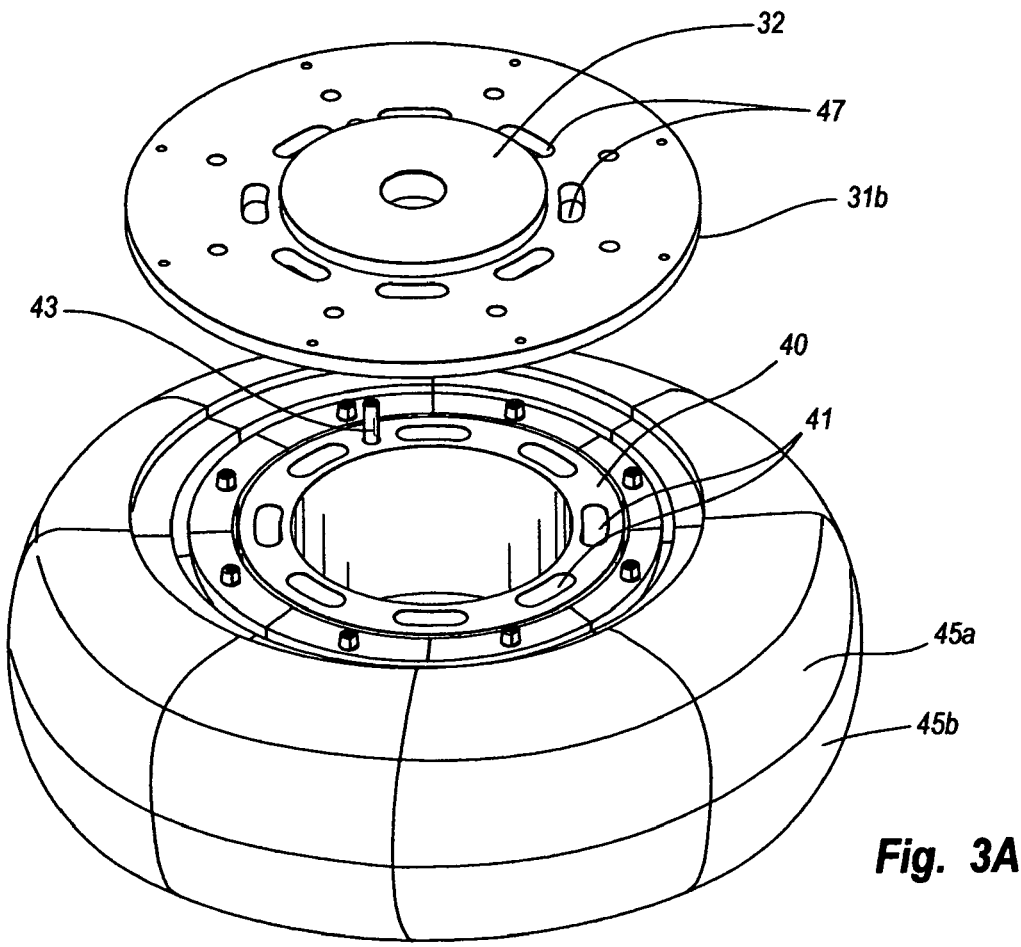
FIG. 3A shows the completion of the hard foam core segments assembly and with a top hub plate fitted onto the hard foam core segments.
Figure 3B:
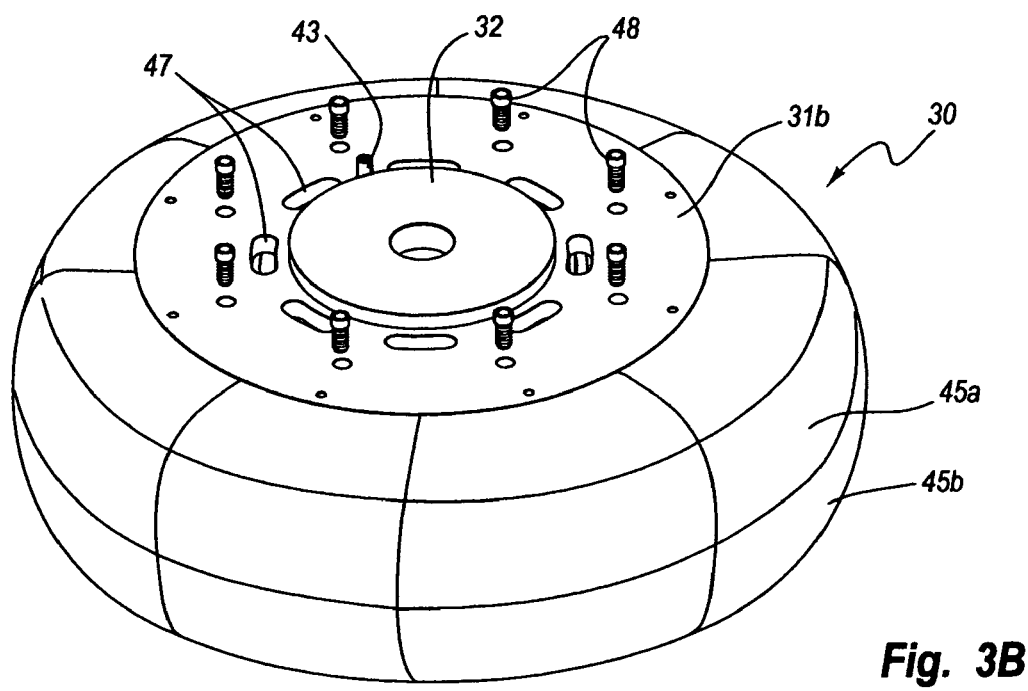
FIG. 3B shows the top hub plate being bolted onto the top of the cylindrical hub manifold.

For forming the inner mold 30 of FIG. 3B, that includes a mandrel formed by assembling tread segments 45a and 45b into a cylinder, as shown in FIGS. 2A and 2B, to have the shape of a transport tire inner surface, an inner mold hub base 31a, as shown in FIG. 1, is used. The inner mold base 31a is shown as having a center dish 32 with a center opening 33 that includes spaced elliptical ports 34, and is stepped upwardly into a continuous shelf 35 that posts 36 are mounted to, to extend at right angles therefrom. Which posts 36 are located at spaced intervals to one another, and each post includes a threaded nut 37 that is secured onto each post end 36a. Outwardly from the posts 36, the hub base 31a is stepped upwardly into a lip 38 and, outwardly from the lip 38, it is stepped downwardly into a flat portion 39 that extends to the plate edge. Shown in FIG. 1, a cylindrical hub 40 is fitted onto the mold hub base 31a. Which cylindrical hub has a center opening 42 therethrough, has its lower end aligned to fit onto the center dish area 32, and is positioned thereon to align spaced elliptical ports 41 with the spaced elliptical ports 34 of the hub base. The cylindrical hub 40 is maintained in position by fitting a rod 43 through a side longitudinal hole 44 and turning a rod threaded end 43a into a threaded hole 44a that is formed into a side of the hub base 31a.

FIG. 2A shows the hub 40 fitted onto the inner mold hub base 31a and is maintained thereon by the rod 43 threaded end 43a turned into the hub base threaded hole 44a, as shown in FIG. 1. FIG. 2A shows mounting holes of the hard foam core top and bottom sections 45 and 45b, respectively, that form the mandrel, with each hard form core section receiving one of the posts 36 fitted therethrough. With, in FIG. 2B, all but one pair of hard foam core top and bottom sections 45a and 45b have been fitted onto posts 36, and nuts 37 are shown as having been turned onto the post threaded ends 36a.

FIG. 3A shows the top of the hub 40 with the hard foam core top and bottom sections 45a and 45b assembled thereon, forming the mandrel, that is aligned with a hub top 31b with, it should be understood, the hub base and top, 31a and 31b, respectively, being a mirror image of one another. FIG. 3B shows the hub top 31b fitted onto the top of hub 40, with spaced elliptical ports 41 formed through the hub top 31b that includes elliptical ports 47 that align with the elliptical ports 41 in hub 40 and the elliptical ports 34 in the hub base 31a, proving flow paths through the assembly, and showing bolts 47 each aligned for turning through the hub top 31b and into a nut 37. With each nut 37 shown as having been turned onto a threaded end 36a of each post 36, completing the assembly of the inner mold 30, where the assembled hard foam core sections function as a mandrel for building up tire core 75 of FIG. 8A thereon.

Figure 4A:
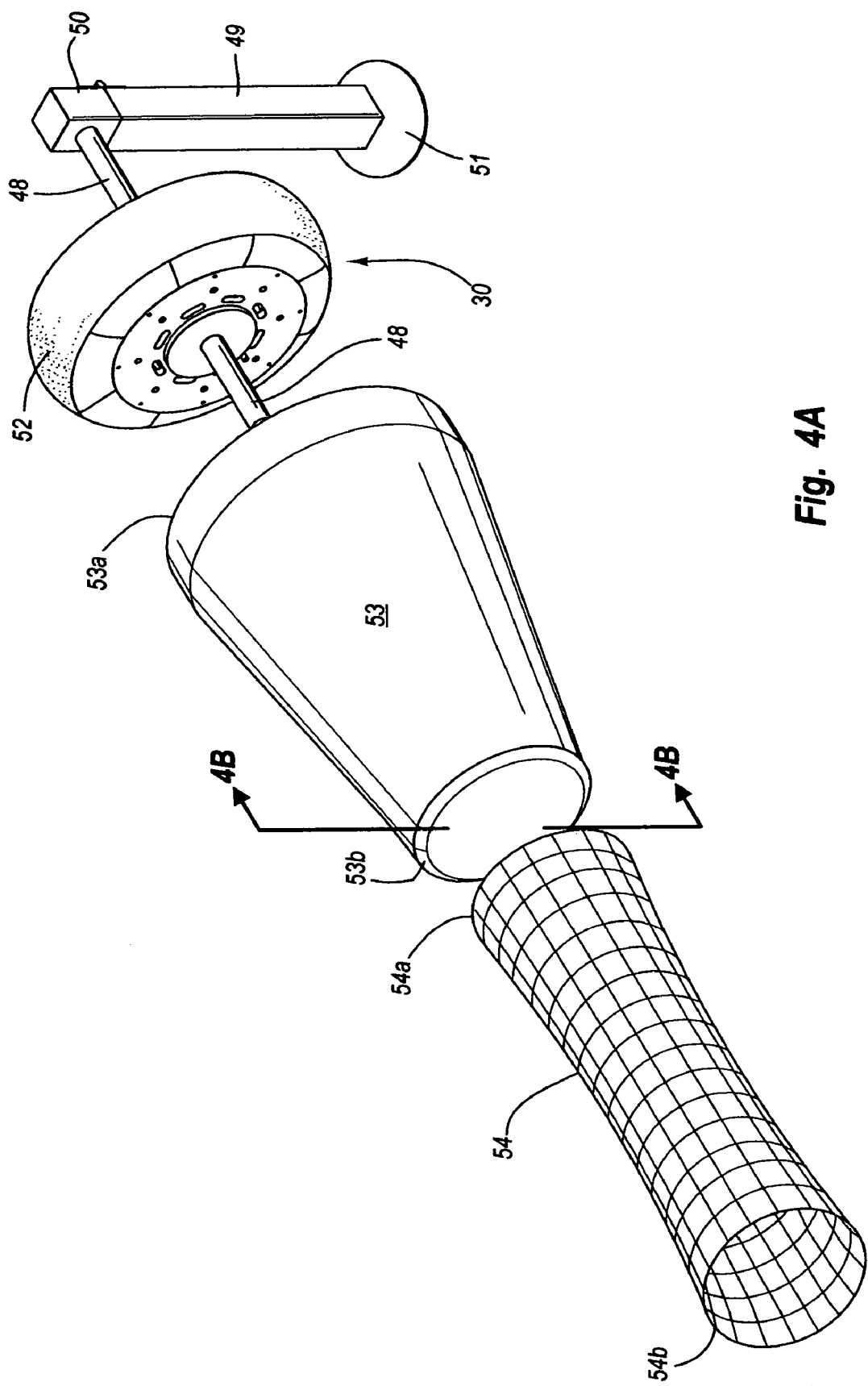
FIG. 4A shows the hard core assembly of FIG. 3B as having been mounted onto an axle that is fitted to a pivoting arm, with the hard core assembly shown rotated ninety degrees, showing an expander cone aligned with the side of the hard core assembly, and showing a sleeve woven from ply cords aligned to fit over the expander cone smaller end.

To prepare for forming which tire core 75, as shown in FIG. 4A, the inner mold 30 has had an axle 48 mounted through the aligned center openings 33 in the hub base and top 31a and 31b, as part of a build stand that allows the inner mold 30 to be pivoted from a horizontal attitude through ninety degrees, and with the axle 48 extending at a right angle outwardly from a pivot post 49. Which pivot post 49 preferably includes a pivoting joint 50 that allows the inner mold 30 to be pivoted to a horizontal attitude, and with the base 51 thereof arranged to allow for three hundred sixty degrees of rotation.

Figure 10:
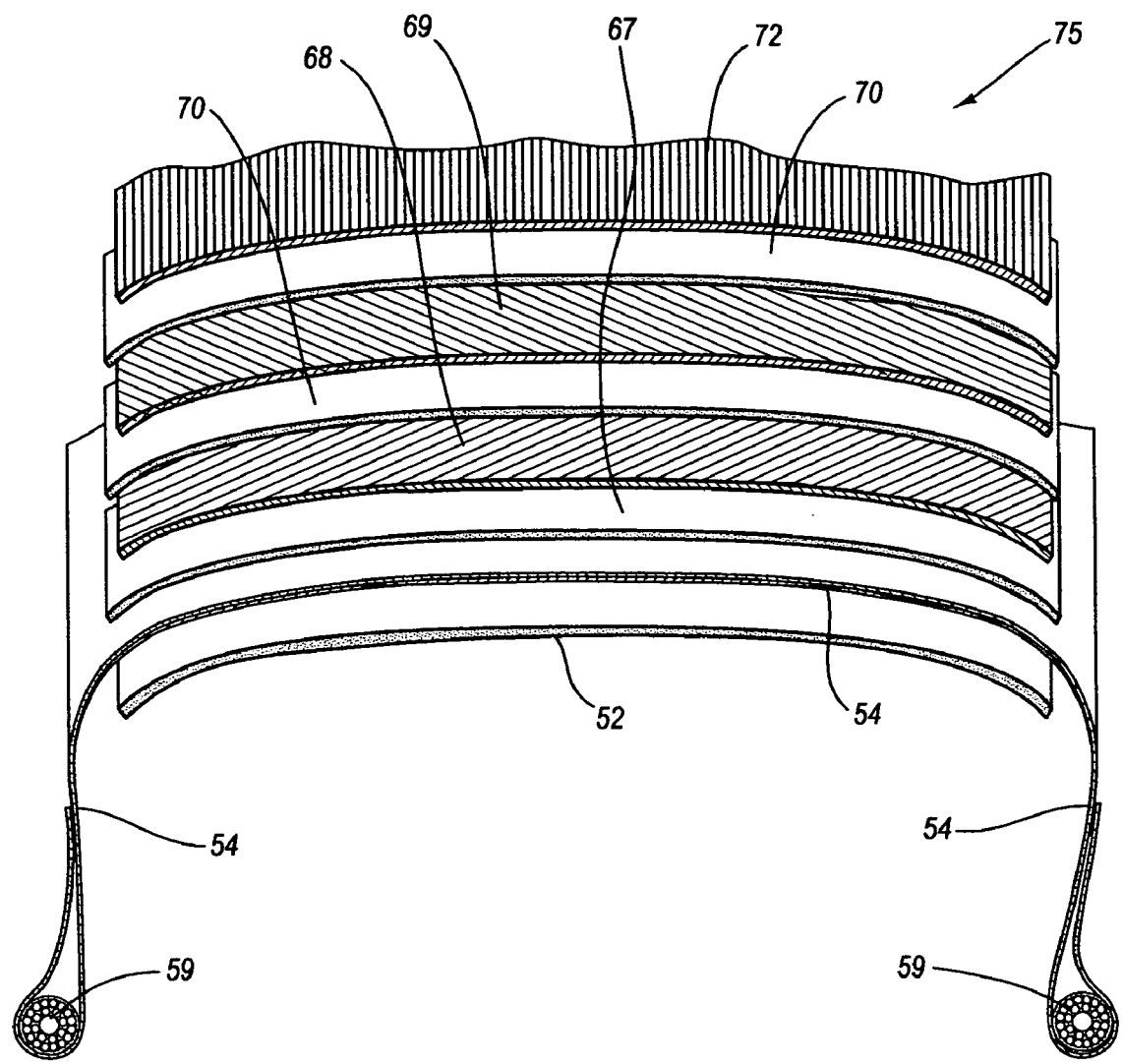
FIG. 10 shows a side elevation exploded sectional view of a section of a tire manufactured by the process and with the apparatus of the invention as has been removed from the outer mold of FIG. 9D.

To begin to form the core of plies, belts and beads 75, as shown in FIG. 10, that is for positioning in the vacuum forming apparatus of the invention, as shown in FIG. 4A, a layer of spacing material 52 is wrapped around the inner mold 30 crown, that is preferably at least a two ply or layers of cotton batting. An expander cone 53, that is shown as a truncated cone having a greater diameter forward end 53a and a lesser diameter rear end 53b, is fitted onto, to slide along axle 48. The expander cone 53 is to receive a sleeve 54 that is sleeve woven from plies cord that, for a practice of the invention, is preferably rayon or cotton cord that, in practice, has been found to accept a flow of the elastomeric material into the cord surface, providing a weld of the cord and elastomer that is resistive to separation. Which sleeve, as needed, can include strands of an elastic material woven therein to allow for expansion as the sleeve is fitted over the expander cone lesser diameter rear end 53b and drawn therealong.

Figure 4B:
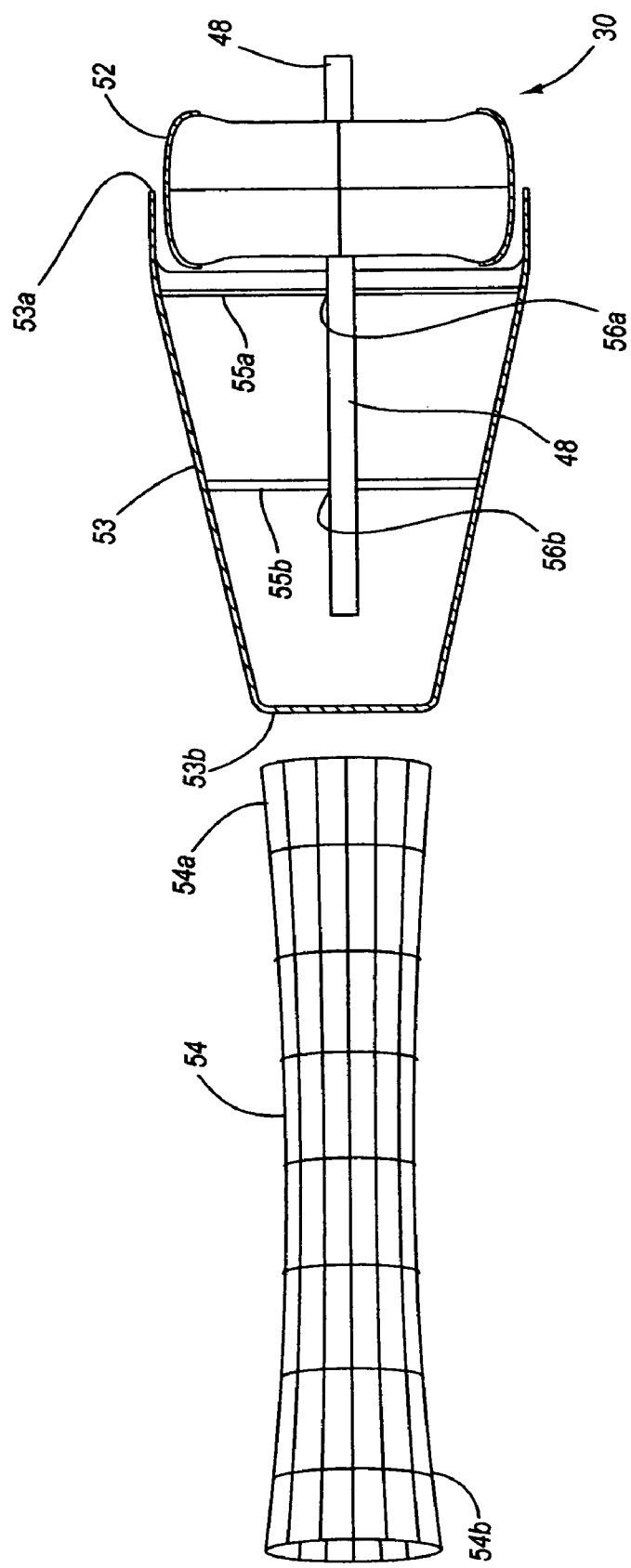
FIG. 4B shows a top plan sectional view taken along the line 4B-4B of FIG. 4A looking down on the hard foam core assembly with the expander cone large diameter end slid along the expander cone to the center of the hard core assembly, showing the plies sleeve aligned for fitting over the expander cone small diameter end.

FIG. 4B shows the expander cone 53 as having had its forward end 53a moved over the edge of the layer of spacing material 52 to approximately the center of the inner mold 30 mandrel crown. Which expander cone, to allow such movement, includes spaced parallel forward and rear inner walls 55a and 55b, respectively, that each have a center hole 56a and 56b therethrough that align to receive the axle 48. The axle 48 supports and guides the expander cone 53 as it is slid back and forth therealong.

Figure 4C:
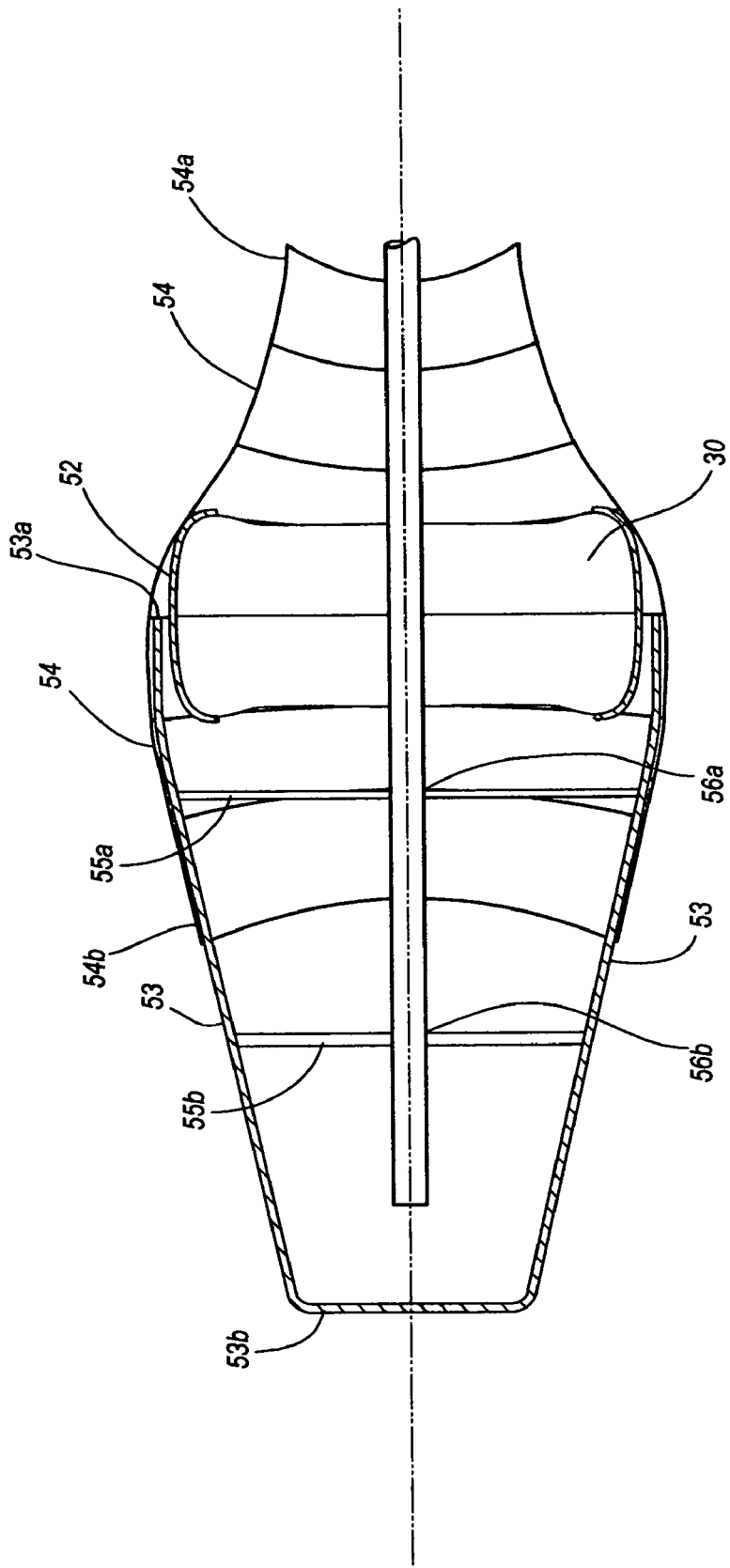
FIG. 4C is a view like that of FIG. 4B except that the plies sleeve end has been drawn over and beyond the hard core assembly.

FIG. 4C shows the components of FIG. 4B except that the forward portion of the plies sleeve 54 has been pulled across the inner mold 30 mandrel, with the back section still supported by the expander cone 53.

Figure 5A:
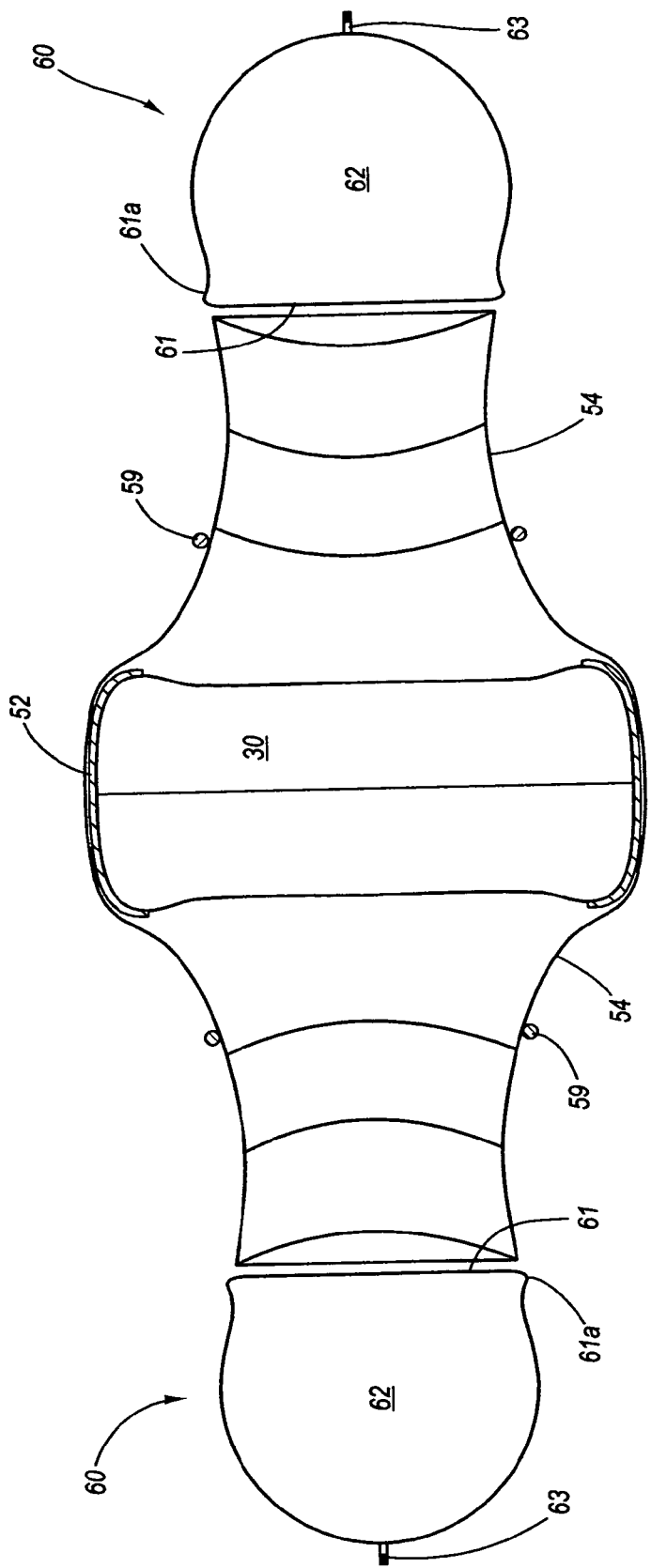
FIG. 5A is a view like that of FIG. 4C only showing a pair of bladder and hard plate assemblies for bead centering and plies cords positioning aligned with the ends of the plies sleeve.

FIG. 5A shows the view of FIG. 4C, except that a pair of bladder and hard plate 60 have been aligned with the plies sleeve 54 ends. Each bladder and hard plate 60 includes a flexible bladder 62 and hard plate 61, which hard plate is a hard metal or plastic and is for centering a bead to a side of the core in the core formation process. The hard plate 61 is mounted onto a side of a balloon type bladder 62 that is to be filled with air under pressure through a valve stem 63. Beads 59 are shown as having been slid along the sleeve 54 into position to receive the hard plate ends 61 fitted there against and showing a separator layer 52 wrapped around the inner mold 30. So arranged, the sleeve 54 is shown as having been passed thereover.

Figure 5B:
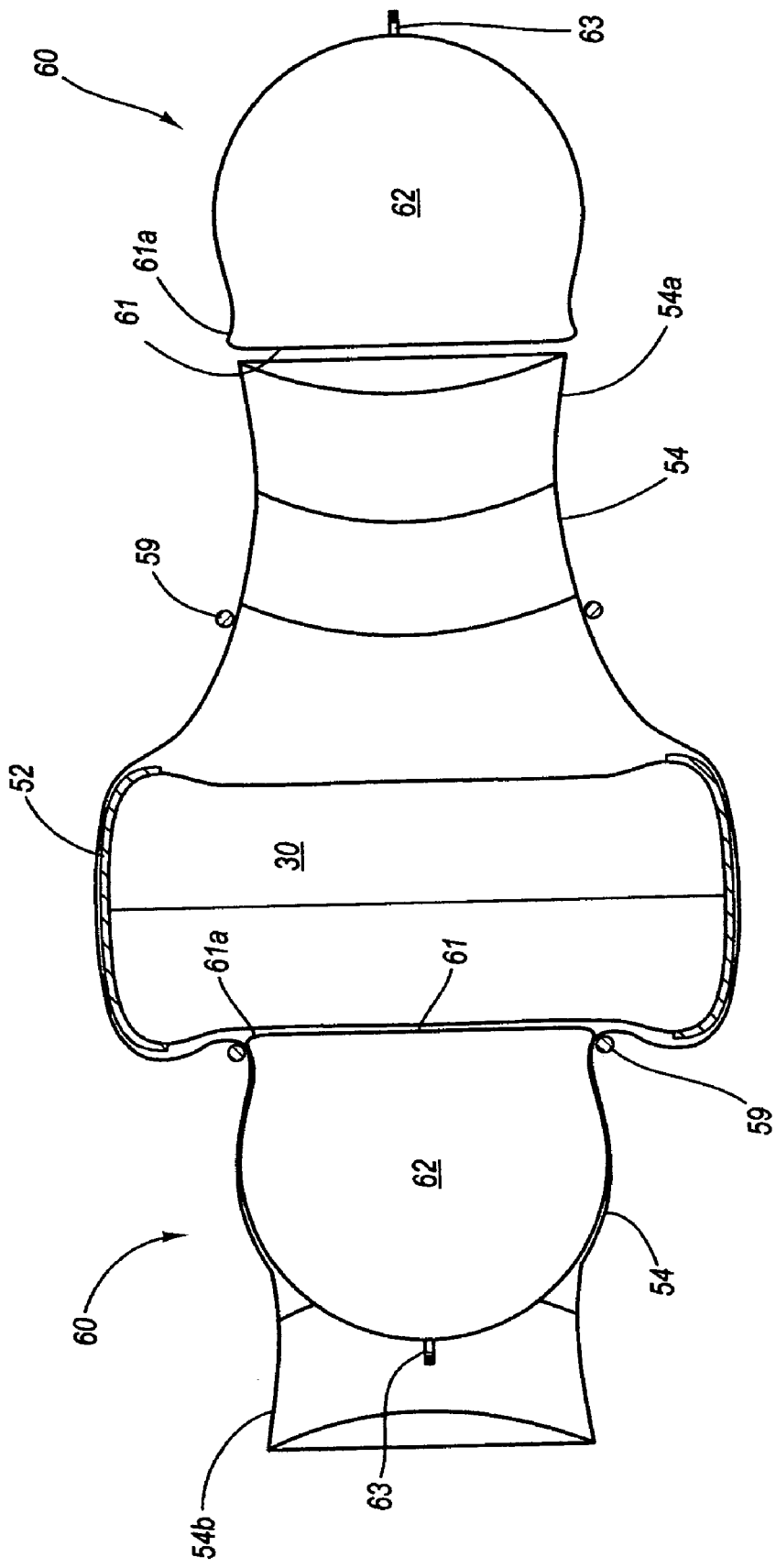
FIG. 5B is a view like that of FIG. 5A only showing the left bladder and hard plate assembly, that is a bead centering plate, as having passed into the plies cords sleeve end to where the hard plate contacts the side of the hard core assembly and showing a bead maintained by the hard plate edge against the hard core assembly left side.

FIG. 5B is a view like that of FIG. 5A only showing the left side bladder and hard plate 60 as having passed into the plies sleeve 54 end to where the hard plate 61 edge 61a is in engagement with the bead 59, through the sleeve 54. Which bladder and hard plate 60 passage is made possible by appropriately filling or emptying the bladder 62 to a desired air pressure through the valve stem 63 to have a diameter where it can be fitted through the sleeve 54.

Figure 5C:
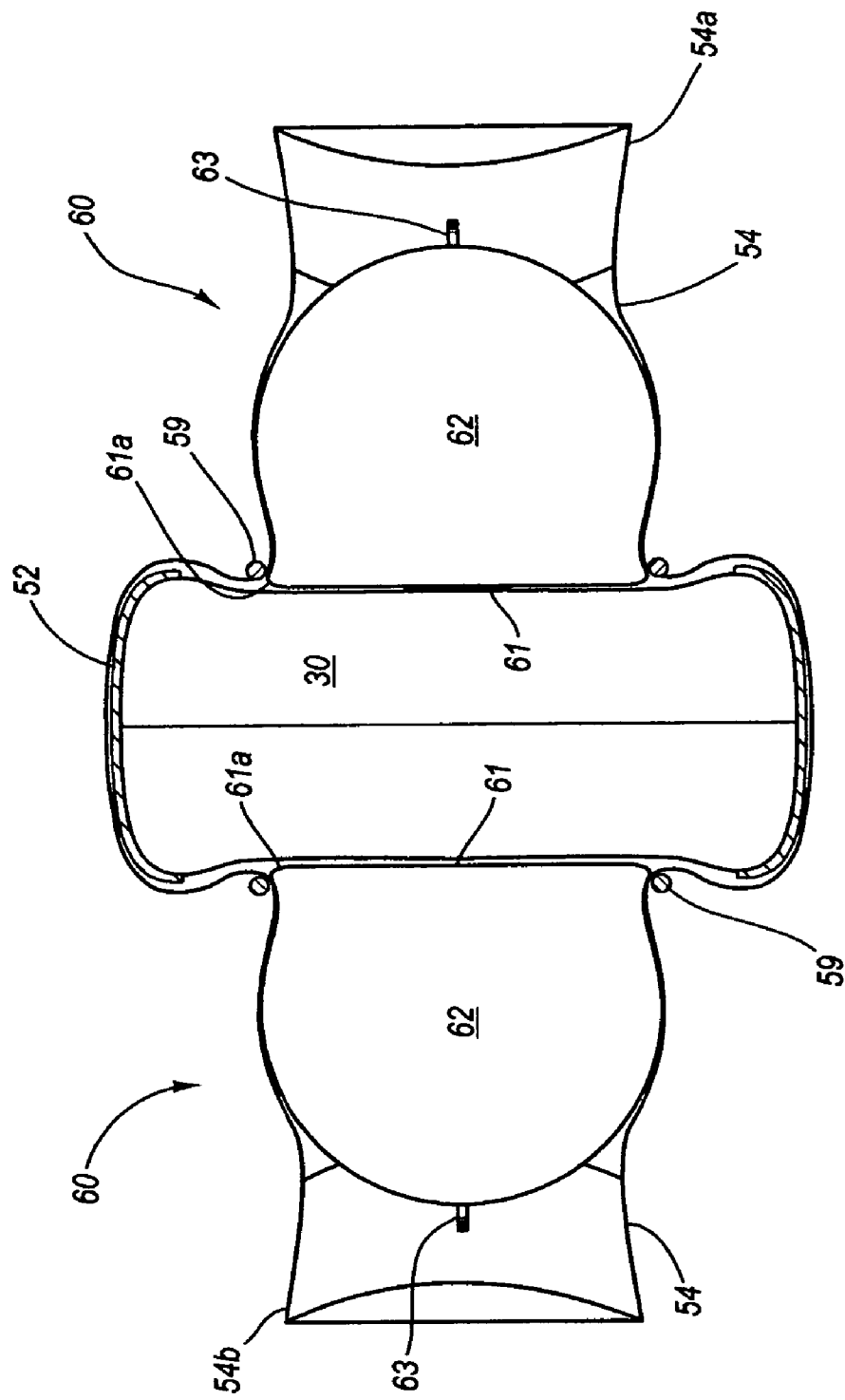
FIG. 5C is a view like that of FIG. 5B that additionally shows the right bladder and hard plate fitted into the plies cords sleeve end and showing a bead maintained by the hard plate edge against the hard core assembly right side.

FIG. 5C is a view like that of FIG. 5B only showing both of the bladder and hard plates 60 as having been passed into the plies sleeve ends, with the beads 59 held against the sides of the inner mold 30, and the plies sleeve 54 beginning to be folded around the beads 59.

Figure 5D:
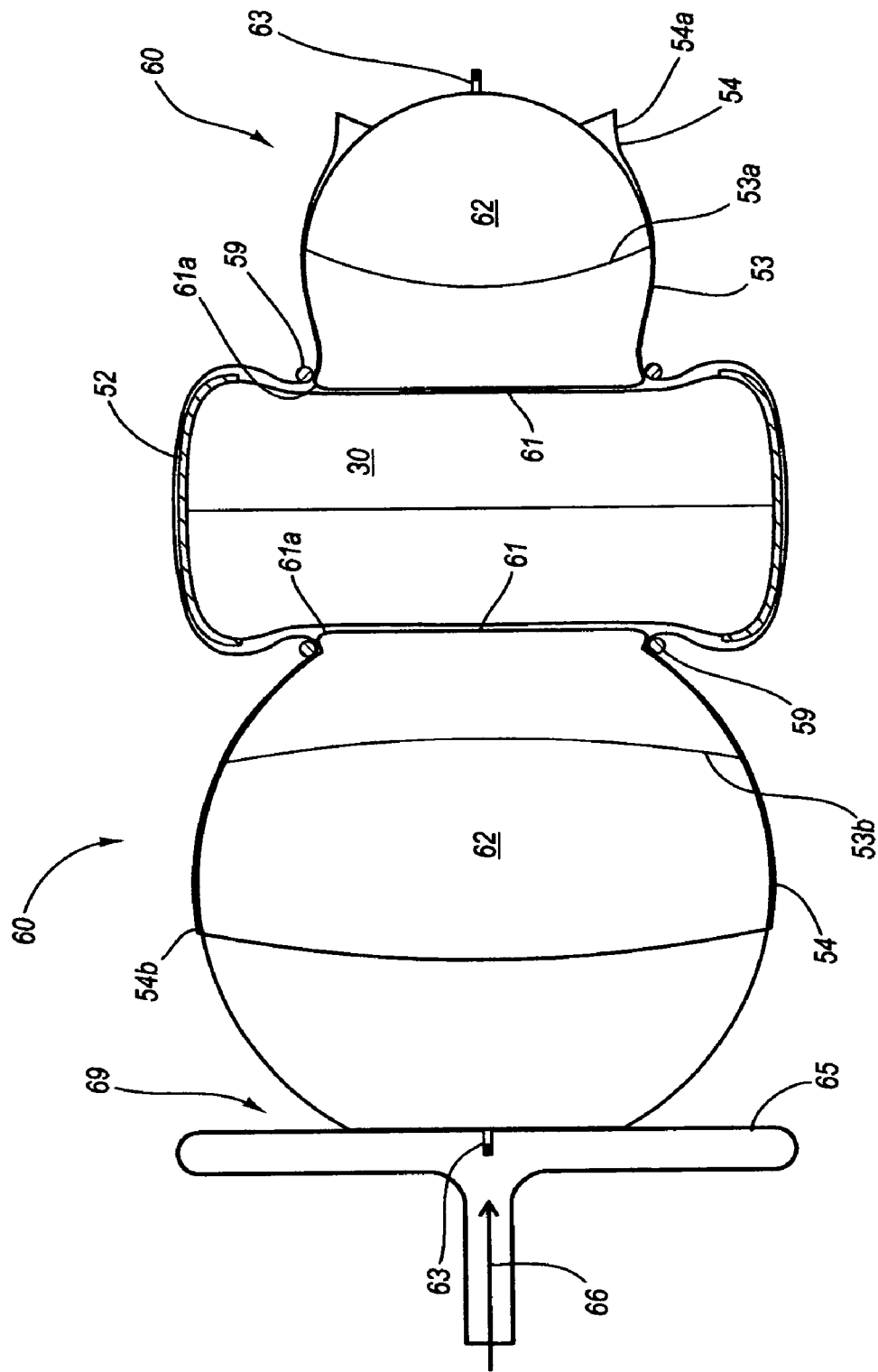
FIG. 5D is a view like that of FIG. 5C only showing a press plate engaging the expanded left bladder, and with the bladder inflated.

FIG. 5D is a view like that of FIG. 5C only showing the plies sleeve ends as having been cut to a lesser length to ends 54a and 54b and showing the bladder 62 of the left bladder and hard plate 60 as having been expanded with air, under pressure, passed through the stem 63, as illustrated by an inwardly pointing arrow. With that expansion, the plies sleeve end 54a is elevated to align with the side of the inner mold 30, and showing a pressure plate 64 in contact with, and pressing against, the expanded bladder 62. Which pressure plate includes a flat piston end 65 whose forward face is in contact with the expanded bladder 62, and a push rod end 66 that extends, at a right angle from, the piston end rear face. Of course, the plies sleeve 54 can be of lesser length to avoid having to cut off the sleeve ends and, also within the scope of this disclosure, the plies sleeve ends 54a and 54b can be left long and folded over the inner mold crown.

Figure 5E:
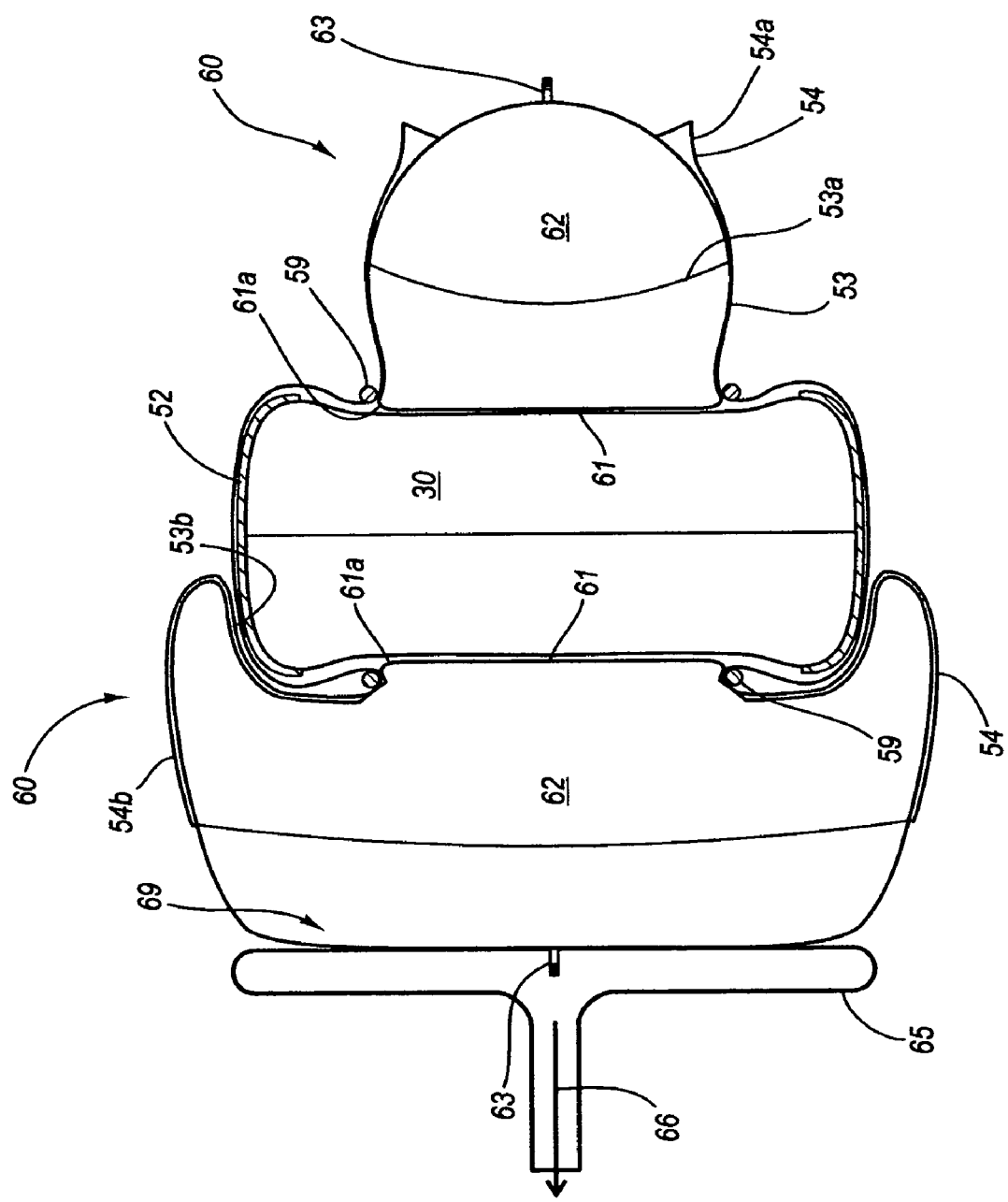
FIG. 5E is a view like that of FIG. 5D only showing the press plate as having been urged against the expanded bladder as air is removed, at a controlled rate, from the bladder, causing the bladder to fold the plies cords over the bead and up the left side of the hard core assembly.

FIG. 5E shows the pressure plate 64 as having advanced into the bladder 63, as air is being withdrawn from the bladder, as illustrated by an outwardly pointing arrow, and shows the bladder as tending to fold around the shoulder of the inner mold 30. Which bladder folding tends to urge the cords of the plies sleeve end 54a away from the bead 59, with the cord ends folding onto the plies sides, and stretched across the inner mold 30. Which operation can include coating the plies cords above the beads with an adhesive, such as a pre cure elastomer, before the plies cords ends are moved by the deflation of the bladder 62.

Figure 5F:
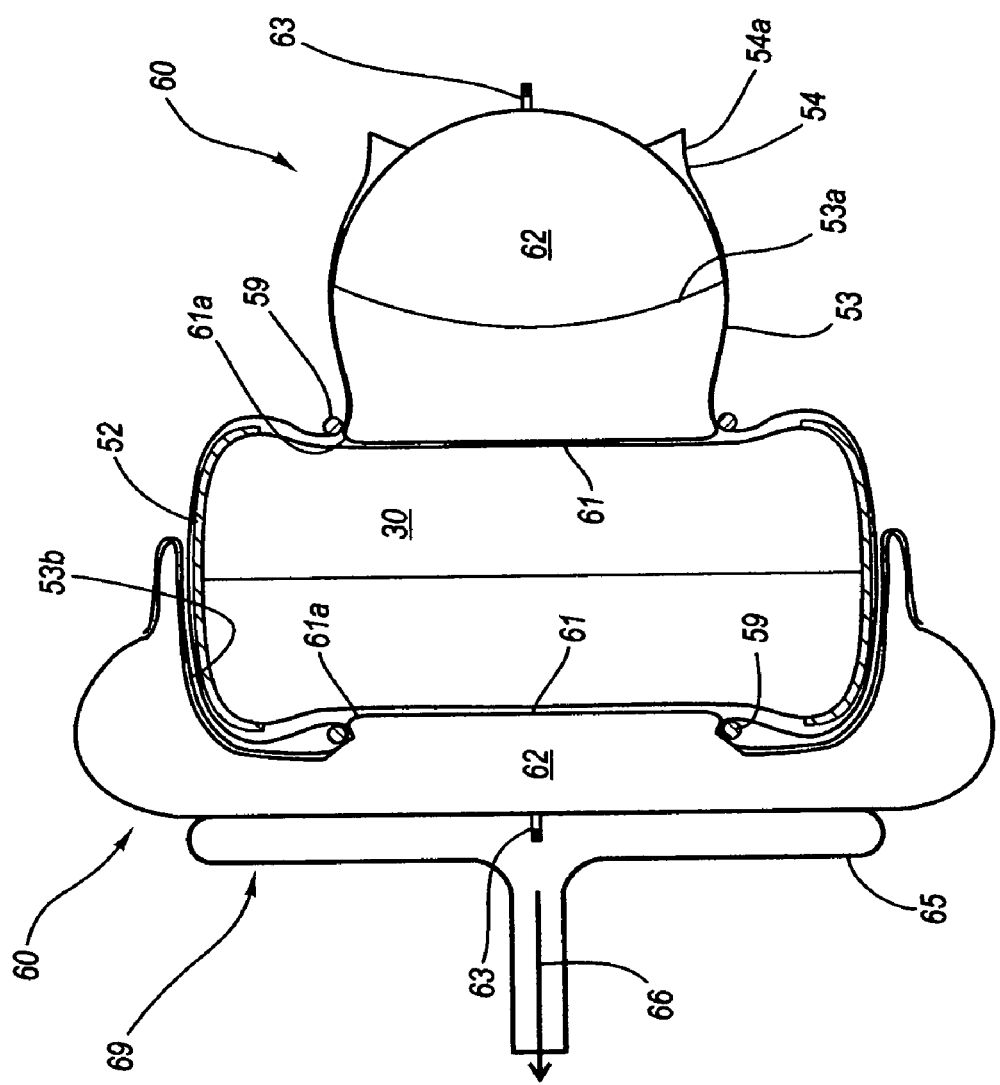
FIG. 5F is a view like that of FIG. 5E only showing the press plate as having been moved to its limit of travel against the bladder and has been deflated to extend the bladder around the hard core assembly shoulders, pushing the plies cords ahead of the bladder surface.

FIG. 5F is a view like that of FIG. 5E only showing the bladder 62 as having been further deflated as air is continued to be withdrawn through stem 63. So arranged the bladder has flowed around the inner mold 30 shoulders with, in that flow, the bladder surface has tended to stretch the plies cords ends 53a away from bead 59 and urge the plies cords ends into close engagement with the plies cords above the bead. Which action tends to force any trapped air out from the bonding material and between the plies cords and plies cords ends. While the operation of the left bladder and hard plate 60 only has been shown, it should be apparent that the operation of the right side bladder and hard plate 60 is identical, and which bladders and hard plates 60 can operate simultaneously, producing, when the bladders and hard plates are removed, a core of plies and beads that is ready to receive a belt or belts applied around the inner mold crown, as set out below.

The above description of FIGS. 4A through 4C and 5A through 5F sets out a process for providing a core of plies and beads that are formed in layers on the mandrel portion of the inner mold 30. With, in FIGS. 5A through 5F, the plies cords are shown cut to fold to above the bead but do not extend beyond the inner mold shoulders. Though, it should be understood within the scope of this disclosure, that the plies ends can be folded across the mandrel crown, crossing one another, dependent upon the lengths of the cord plies ends.

Figure 6B:
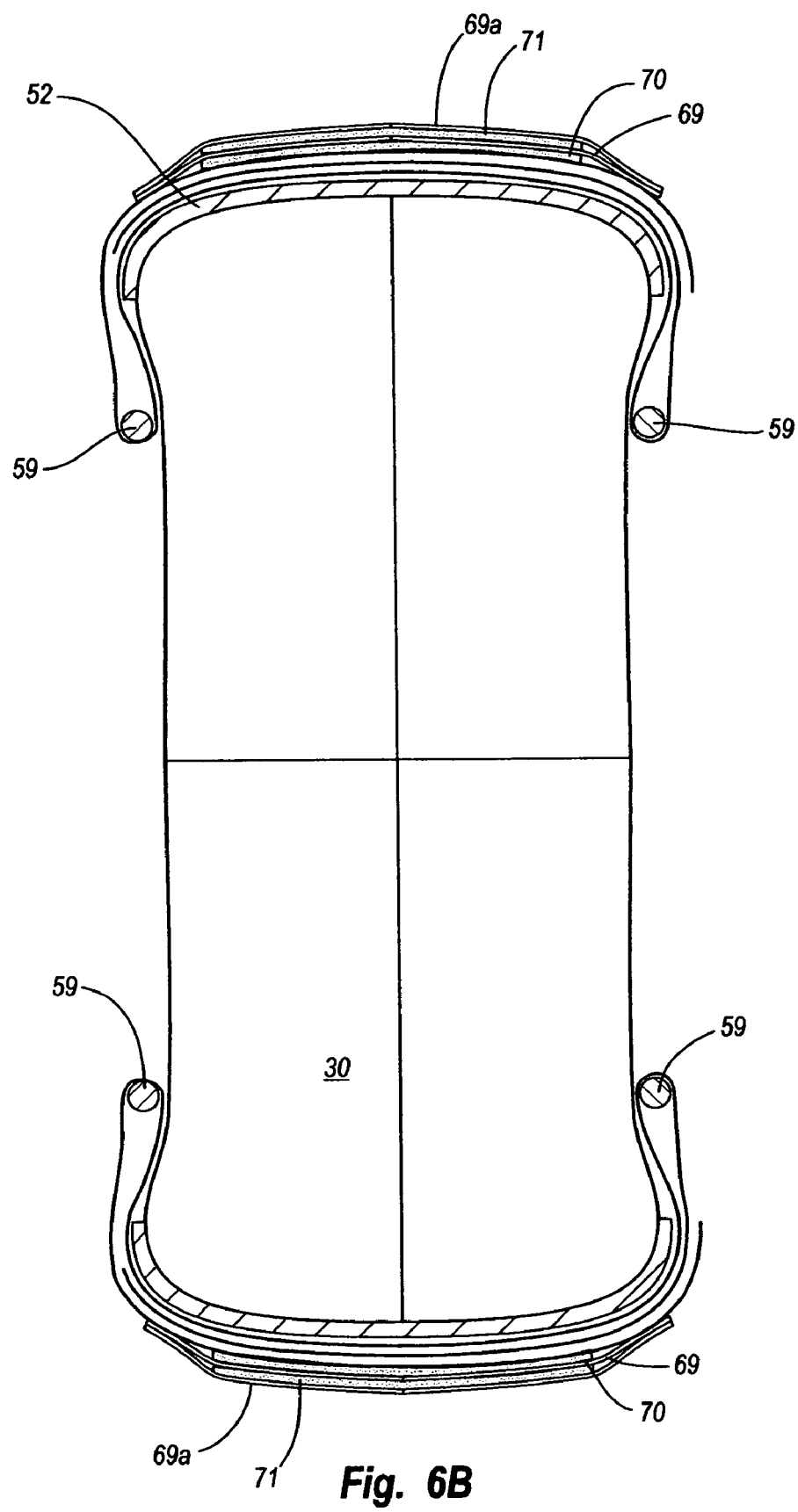
FIG. 6B shows the hard core assembly with the plies ends extending up the hard core assembly sides, with spacers arranged between the plies and belt and with a final layer of tire cord wound around the crown.
Figure 7A:
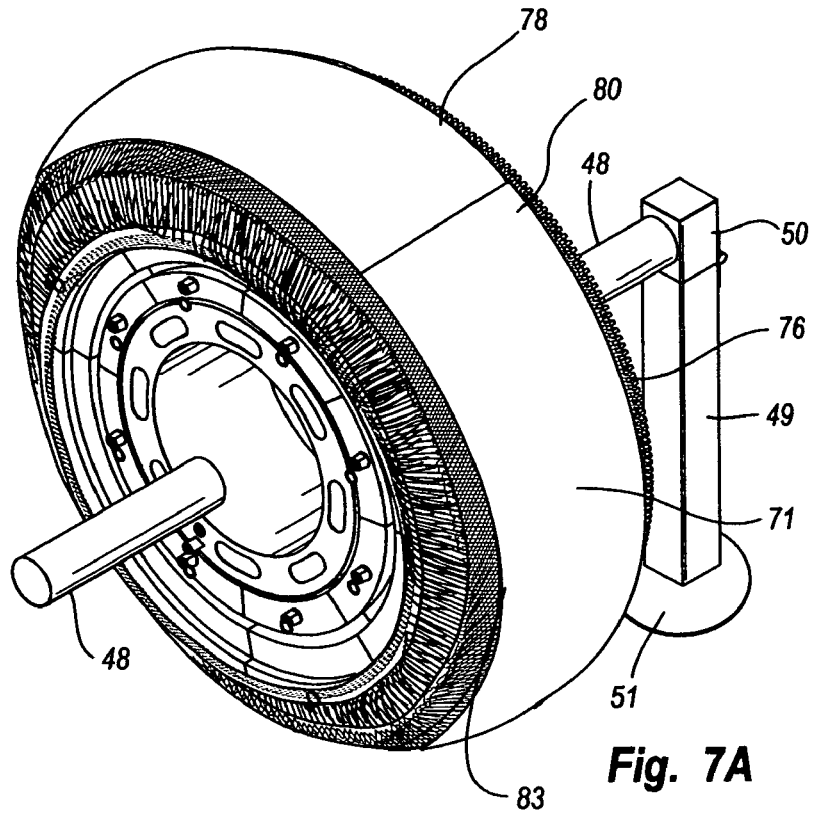
FIG. 7A shows a view like that of FIG. 6B only showing a layer of cotton batting wound around the core circumference.
Figure 7B:
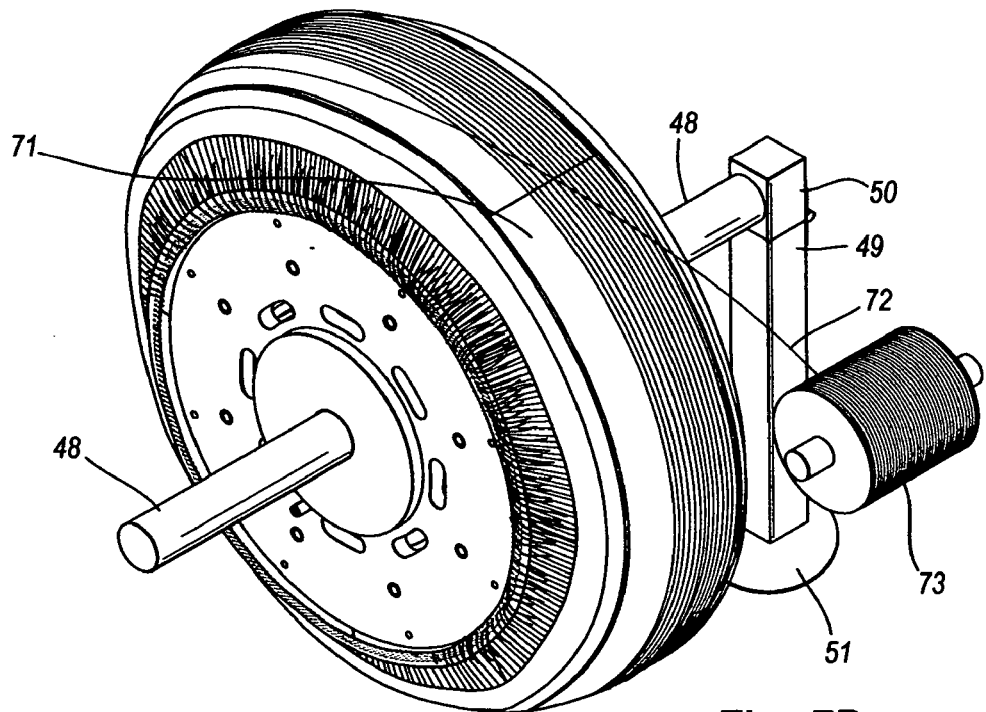
FIG. 7B shows a view like that of FIG. 7A and additionally illustrates, with a spool, that a continuous cord is being rolled off the spool, and is wound around the crown that has been covered by a separator layer of cotton batting.
Figure 7C:
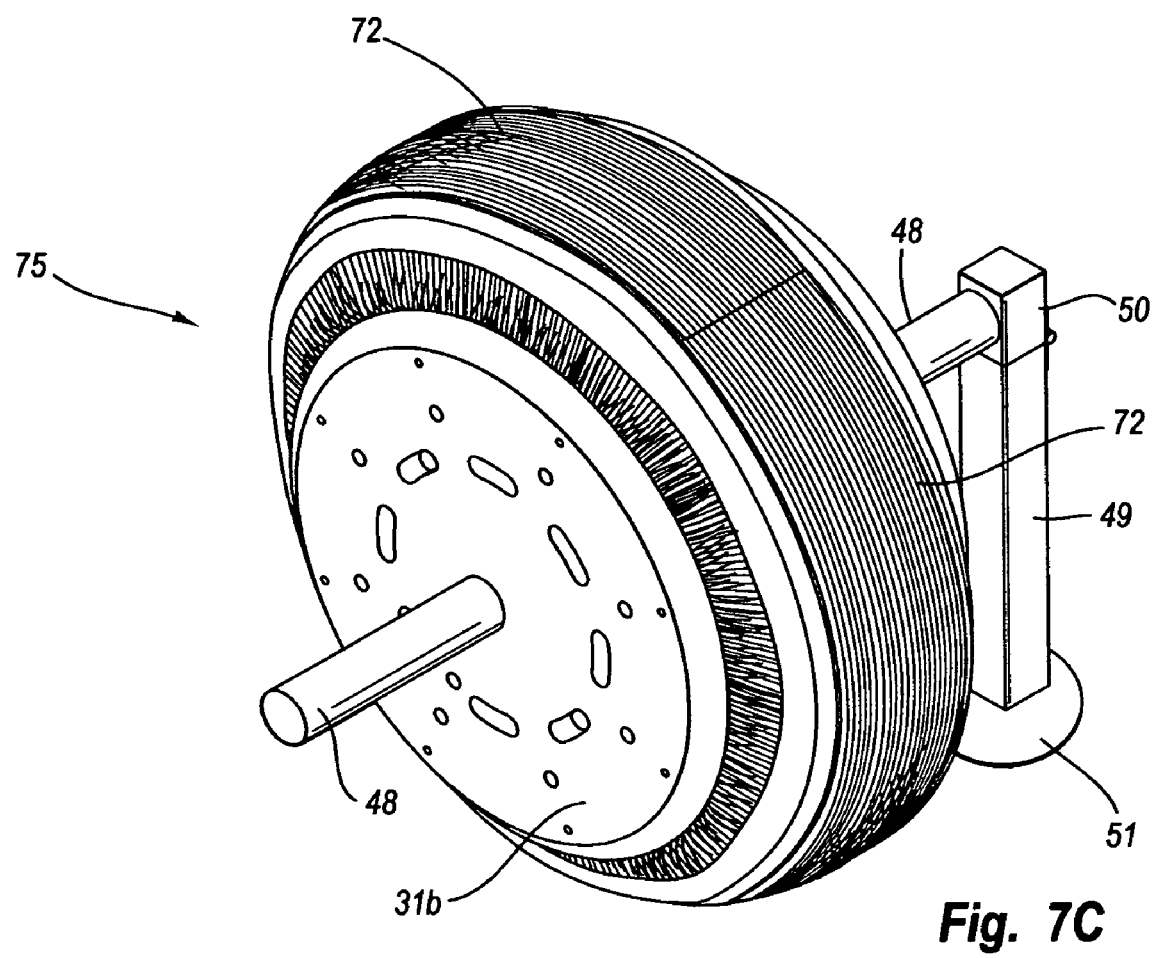
FIG. 7C shows a view like that of FIG. 7B only with the wound tire cord shown as covering the crown.

Shown in FIG. 6A the core of plies and belts of FIGS. 5A through 5F has received a separator layer or layers 67 that are preferably sections of cotton batting installed around the inner mold 30 mandrel crown. Thereafter, a belt expander 68, that is like and functions like, and in practice may be the same as the truncated cone plies expander 53, so long as its greater diameter end will fit over the side of the inner mold whereon have been formed the plies with separator layers, extending to at or near to the center of the inner mold crown. So arranged, as shown in FIG. 6A, a first belt 69 and, as required, a second belt 69a can be passed over the belt expander 68 lesser diameter end and slid therealong, as illustrated by arrows A. The first belt 69 is fitted across the inner mold 30 crown, followed by a separator layer 70, as shown in FIG. 6B, followed by the second belt 69a. Whereafter, the belt expander 68 is removed and a top separator or spacer layer 71 is applied to the top surface of the second belt 69a, as shown in FIGS. 6B and 7A. A preferred spacing material is a four layer section of cotton batting that is approximately eight inches wide, and is wound circumferentially around the crown to hold the plies in place. The sides of which final separator spacer layer 71 are, in turn, pulled down around the inner mold 30 shoulders, engaging the plies 54, as shown in FIG. 7B. Finally, a tire cord 72, that is shown in FIG. 7B being wound off of a spool illustrating a continuous cord, is applied by winding a strand of tire cord around the belt circumference, with the winding starting on one side of the crown and proceeding to the other crown side, as shown in FIG. 7C, completing the assembly of the core of plies, belts and beads 75 of the invention as shown in FIG. 10.

For belt formation and application, as shown in FIGS. 6A and 6B, the sleeves of belts 69 and 69a are preferably formed separately by weaving methods where the belt cords are woven together to cross and have a twenty four degree cord angle to the center of the belt circumference, and after the first belt 69 is fitted to the inner mold, a layer of a separator 70, that is a gauze material, preferably cotton batting, having approximately four layers, is wrapped around the first belt 69 circumference. Whereafter, the second belt 69a, as set out above, is installed over the separator 70. Should additional belts be required, each belt is separated from the belts below and above by a separator, that is also preferably sections of cotton batting. A final separator layer 71 is applied over the top belt. A tire wrap 72 consisting of a winding of tire cord, that is preferably a Kevlar cord, is applied over the final separator layer 71, as described above and as shown in FIG. 7B, as being wound off of a spool 73 and around the crown, with the winding traveling from one side of the crown to the other. Such winding can be accomplished as by turning the inner mold and winding a Kevlar cord across the inner mold circumference, completing the core 75 formation on the inner mold 30 mandrel.

Figure 8A:
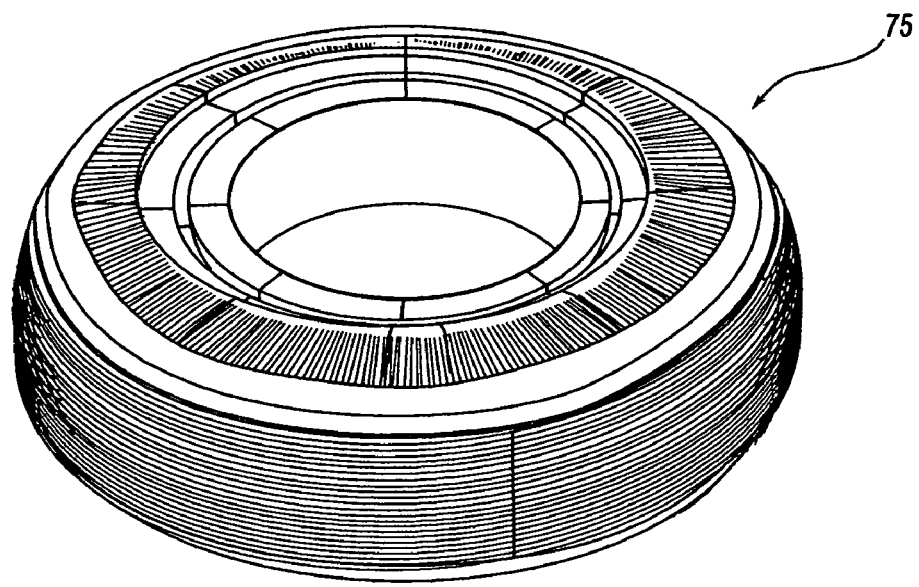
FIG. 8A shows the hard core assembly, with the tire core wound thereon, removed from the axle and positioned onto a mold base.
Figure 8B:
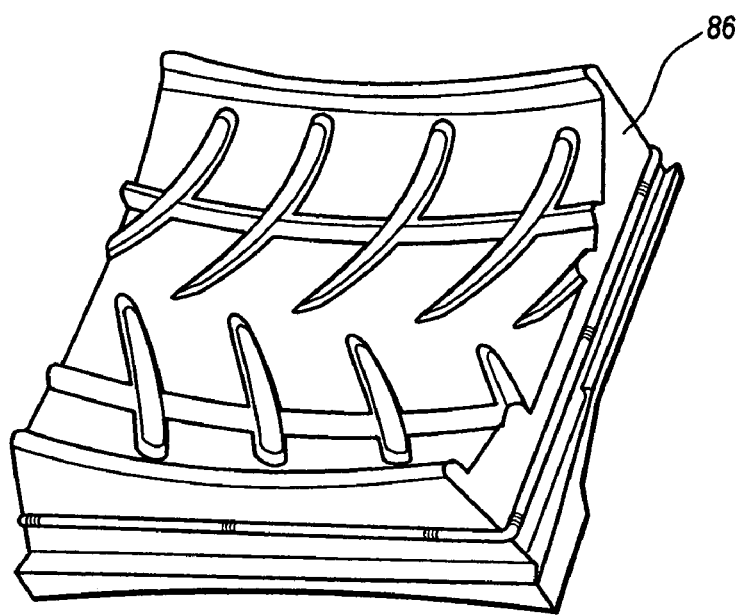
FIG. 8B shows one of a number of tread segments that are fitted together to form the exterior or outer mold.
Figure 8C:
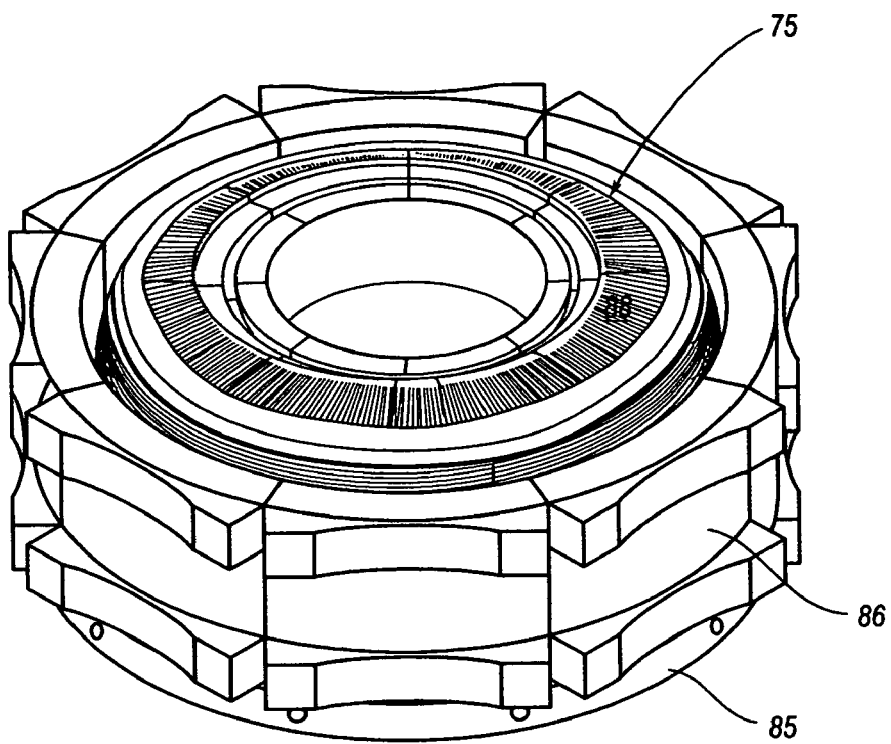
FIG. 8C shows the tread segments of FIG. 8B assembled into the mold outer wall.
Figure 8D:
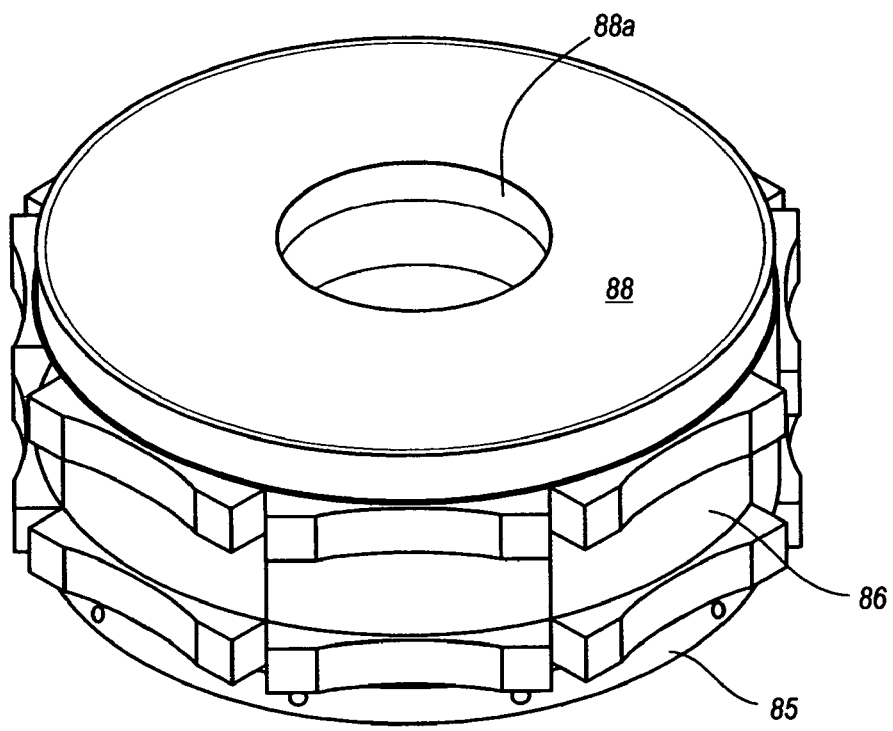
FIG. 8D shows a top plate installed onto the assembly of FIG. 8C showing a center opening wherethrough a center cylindrical canister of a vacuum forming apparatus of the invention is fitted.
Figure 8E:
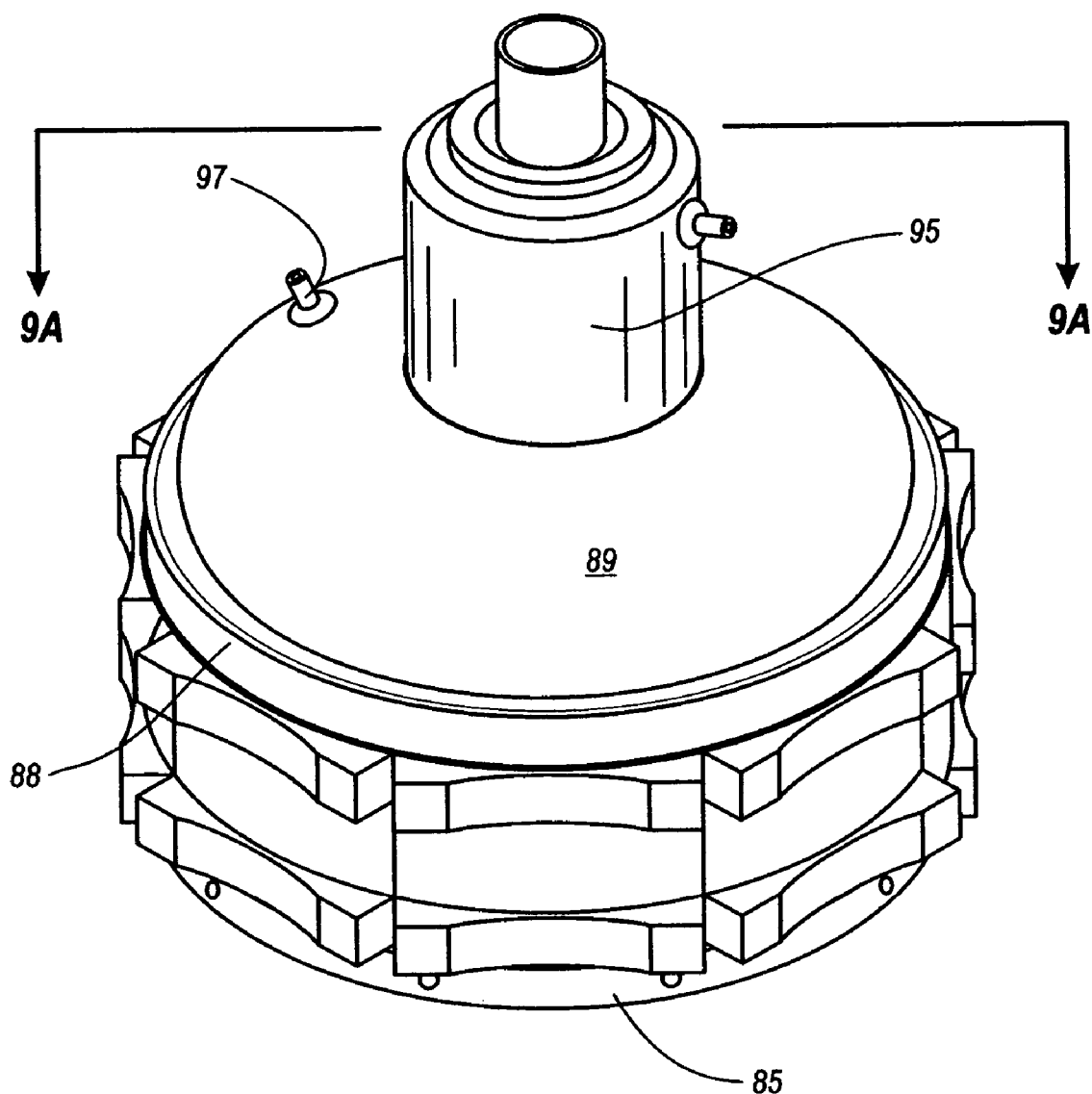
FIG. 8E shows a view like that of FIG. 8D only showing a dome shaped cover mounting a head end of center cylindrical canister fitted onto the outer mold cover with the center cylindrical canister fitted into, and extending upwardly from, a center opening, and showing first and second vacuum ports fitted, respectively, into the side of the center cylindrical canister and the top of the dome shaped cover.

The core 75, shown in FIGS. 8A, 8C and 10, is turned and is moved onto an outer mold base 85, shown in FIG. 8C, that receives tread segments 86 or a ring having a tread formed around the crown of its inner surface, not shown. The tread segments are individually numbered and are fitted together, in numerical order, around the outer mold base 85, encircling the outer mold base and forming a cylinder, as shown in FIG. 8C. Which tread segments 86, for practicing the invention, include seals 86a, shown in FIGS. 9A through 9D, fitted between the adjacent tread segments 86 and between the tread segment 86 and the outer mold base 85 and outer mold top 88, shown in FIG. 8D, with a sectional view of which outer mold base 85 and outer mold top 88 shown in FIGS. 9A through 9D. Which tread segment seals 86a are provided for blocking a flow under vacuum of the elastomeric material out of the cavity between the inner and outer molds during vacuum forming, as discussed hereinbelow. As shown in FIG. 8D the outer mold top 88 has been fitted across the cylinder of tread segments 86 completing the outer mold. Which outer mold top 88 that includes a vacuum forming apparatus top cover 89 that includes a center opening 89a and is for fitting over an apparatus top plate 91 that fits over a top bead alignment plate 92a, with a space 91a and 94, respectively, between the apparatus top plate 91 and the undersurface of the top bead alignement plate 92a as a vent opening. A seal 96 is fitted between an edge of a center hole 88a formed through the outer mold top 88, and the cylindrical canister 95 surface 95a, blocking passage of air therethrough. With the seals 86a provided between the tread segments 86 and the outer mold top 88 and outer mold base 85 apparatus bottom plate 87, sealing off the mold annular cavity wherein the core 75 is positioned.

The outer mold base 85 apparatus bottom plate 87 supports a combination bead alignment and needle valve positioning plate 92b, and has an outer grooved edge 93b that, like the top bead alignment plate outer grooved edge 93a, supports the bead 59, and further includes a center opening 96a wherethrough a neck mid-portion 101 of a needle valve 100 travels up and down in operation of the vacuum forming apparatus 90 of the invention. To compensate for a difference in diameter of the cylindrical canister 95 outer surface 95a from its top end 105 to a lower portion that necks in from 106 as a funnel area 107 to a nozzle end section 108, a plug 110 is provided that is fitted through the opening 33 in a lower center dish 32. Which plug 110 is shaped to fit and seal against the outer surface of the cylindrical canister 95 funnel area 107 and has a longitudinal center opening 111 wherethrough the nozzle end 108 of the cylindrical canister 95 is fitted. A seal 112 is provides between the nozzle end 108 and plug hole 111 to prohibit a flow of elastomeric material up the cylindrical canister 95 during vacuum forming operations.

The nozzle end 108 of the cylindrical canister 95 includes seal 112 and functions as a seat for the needle valve 100 head end 103 that is shown as having a cone shape, with the cone point to travel into the cylindrical canister 95 nozzle end until the slope of the head end 103 contacts the edge of the nozzle end 108, sealing off flow. Which head end 103 travel is provided when the needle valve body 101 is moved up and down by lifting or lowering the valve body lower end 102. In practice, for example, a servo motor operating a piston that connects to the valve body lower end 102 can provide for needle valve movement, opening and closing the cylindrical canister to a flow of elastomeric materials out from the nozzle end 108, as set out herein below.

Figure 9A:
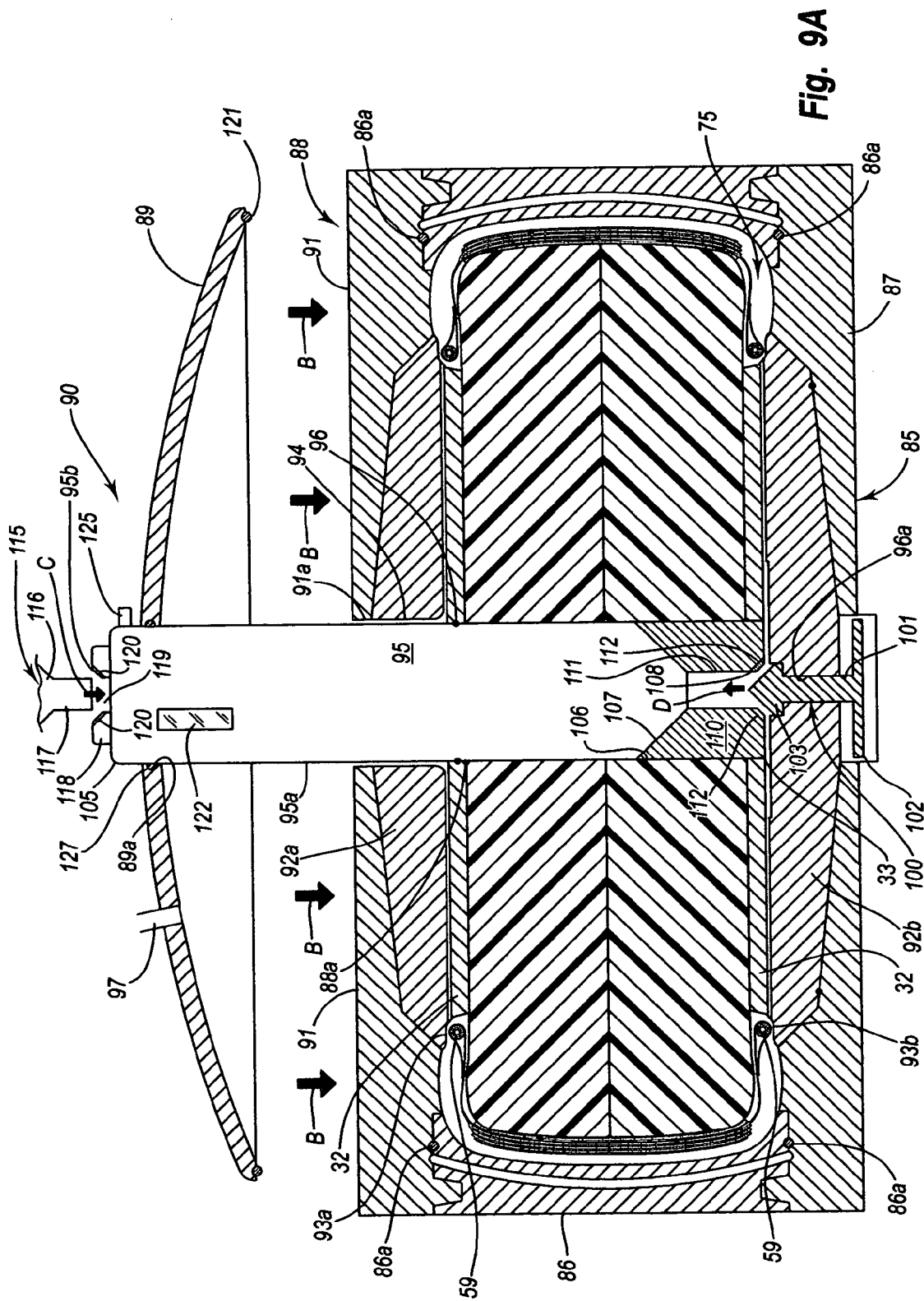
FIG. 9A shows a sectional view taken along the line 9A-9A of FIG. 8E with the dome shaped cover lifted off of the outer mold top, with arrows B illustrating the dome cover as being lowered onto the outer mold top that contains the core of belts, plies and beads laid up on an inner mold mandrel portion, showing, with arrow C, movement of a pouring head into an opening through the top of a deep vacuum canister, and showing with arrow D movement of a needle valve into a bottom end throat of the deep vacuum cylindrical canister.
Figure 9B:
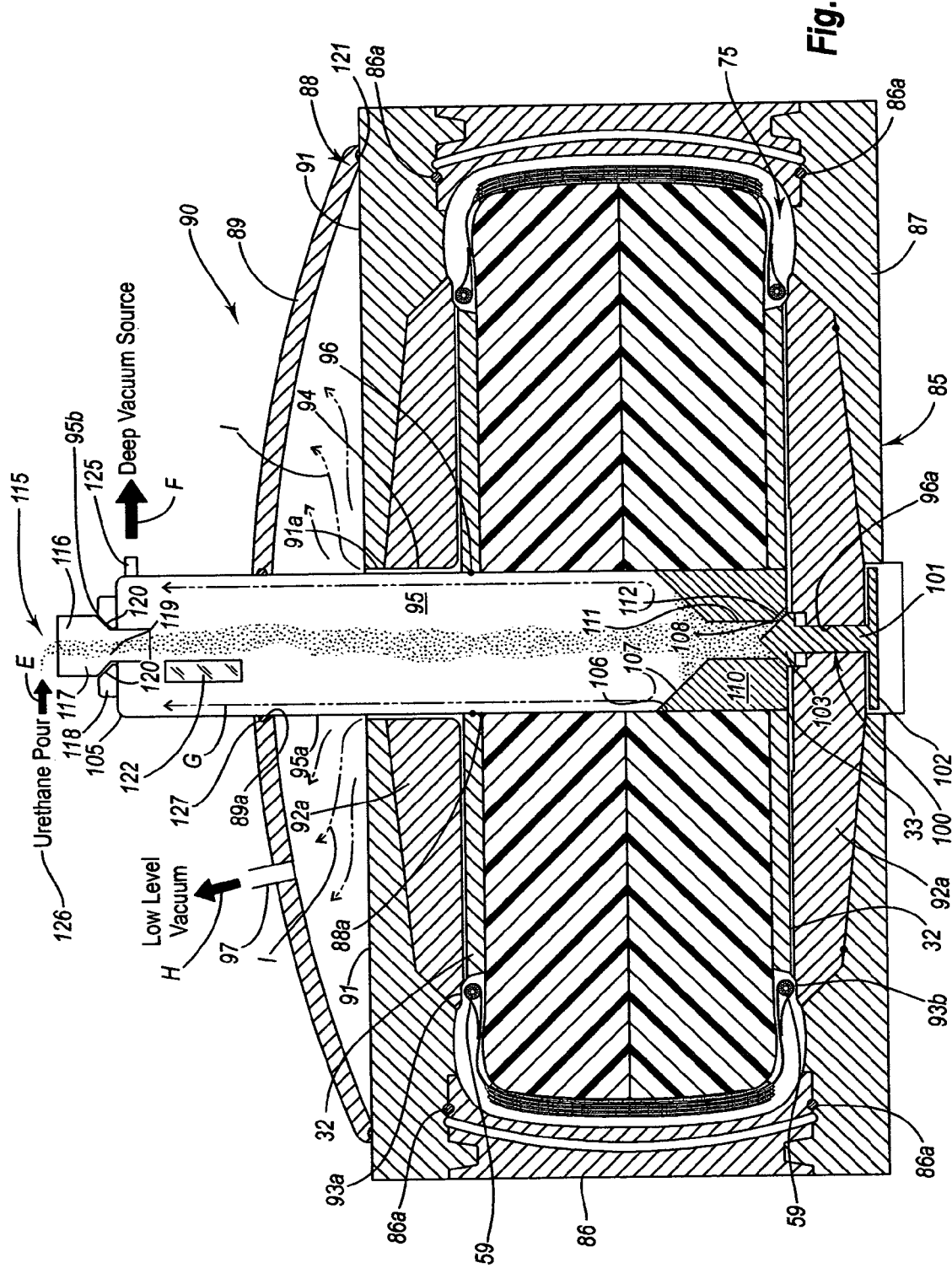
FIG. 9B is a view like that of FIG. 9A only showing the dome shaped cover as having closed over the outer mold top, with a pour of an elastomeric material, arrow E, passed through the pouring head into the deep vacuum canister and showing, with arrow F, a high level vacuum being pulled through a canister port, with that pulled air, shown as arrows G, passing out of the elastomeric material pour, and shows a low level vacuum, shown as arrow H, being pulled through a cover port, pulling air, shown as arrows I, from within the mold cavity and area under the cover.

The cylindrical canister 95 is to receive a mixture of elastomeric constituents that, after mixing outside of the vacuum forming apparatus, is passed through a pouring head 116, as shown in FIG. 9B, and into the cylindrical canister 95. Which pouring head 116 has a funnel shaped pouring end that is an inwardly sloping cone section that connects to a cylindrical nozzle end 117. Shown in FIG. 9A, the cylindrical housing top end 95b is ported to open through a pouring seat 118 that has an inwardly sloping cone shaped section 119 to receive and seal at seal 120 against the wall of the pouring head 116 inwardly sloping cone section.

To prepare the vacuum forming apparatus 90 to form a transport tire, the cover 90 is lowered, as illustrated by arrows B, onto the vacuum forming apparatus top plate 91, sealing thereover at seal 121, and passes along side of the surface 95a of the cylindrical canister 95, with a seal 127 fitted between the cylindrical canister 95 surface 95a and the edge of the center hole 89a of the cover 89, for containing the area under the cover. With the cover 89 maintained in place, to prepare for casting, pouring head 116 is lowered into the pouring seat 118 as illustrated by arrow C, and the needle valve is moved upwardly, as illustrated at arrow D, to close the nozzle end 108. Thereafter, as shown in FIG. 9B, a measured amount of an elastomeric mix of constituents 126 is poured into the cylindrical canister 95 through the pouring seat 118, with an operator observing the canister filling through a sight glass 122 mounted in the surface 95a of the cylindrical canister. Prior to which pouring, a deep vacuum source is connected to cylindrical canister port 125 that is fitted into the side of the cylindrical canister, proximate to the top end thereon, and a low level vacuum source is connected to the cover port 97 fitted through the cover 89, completing preparation of the vacuum forming apparatus 90 to receive a flow of elastomeric material into the cylindrical canister 95, as illustrated in FIG. 9B. Which elastomeric material is a mixture of constituents that are combined outside of the mold for pouring into the cylindrical canister 95. The preferred constituents are a liquid isocyanate and a liquid poly, respectively, that are selected to form, when combined and cured, an elastomer having a desired hardness or derometer for an automobile or like transport tire.

FIG. 9B is a view like FIG. 9a and additionally shows the pouring head 116 as having been seated in the pouring seat 118 with a urethane pour 126, as shown by arrow E, being poured through the open end of which pouring head, flowing into the cylindrical canister, to fill the canister from the nozzle end 108 up. During which canister filling a deep vacuum, arrow F, is pulled through the cylindrical canister 95 port 125, pulling air out of the elastomeric materials mixture that was entrapped therein during the elastomeric material constituents mixing, as shown by arrows G that travels through the cylindrical canister port 125. During which canister filling, an operator views the filling through the sight glass 122. Further, in preparation for the vacuum forming of a transport tire within the vacuum forming apparatus 90, a low level vacuum, shown as arrow H, is pulled through the cover port 97, pulling air, shown as arrows I, out of the mold cavity and the area under the cover 89.

Figure 9C:
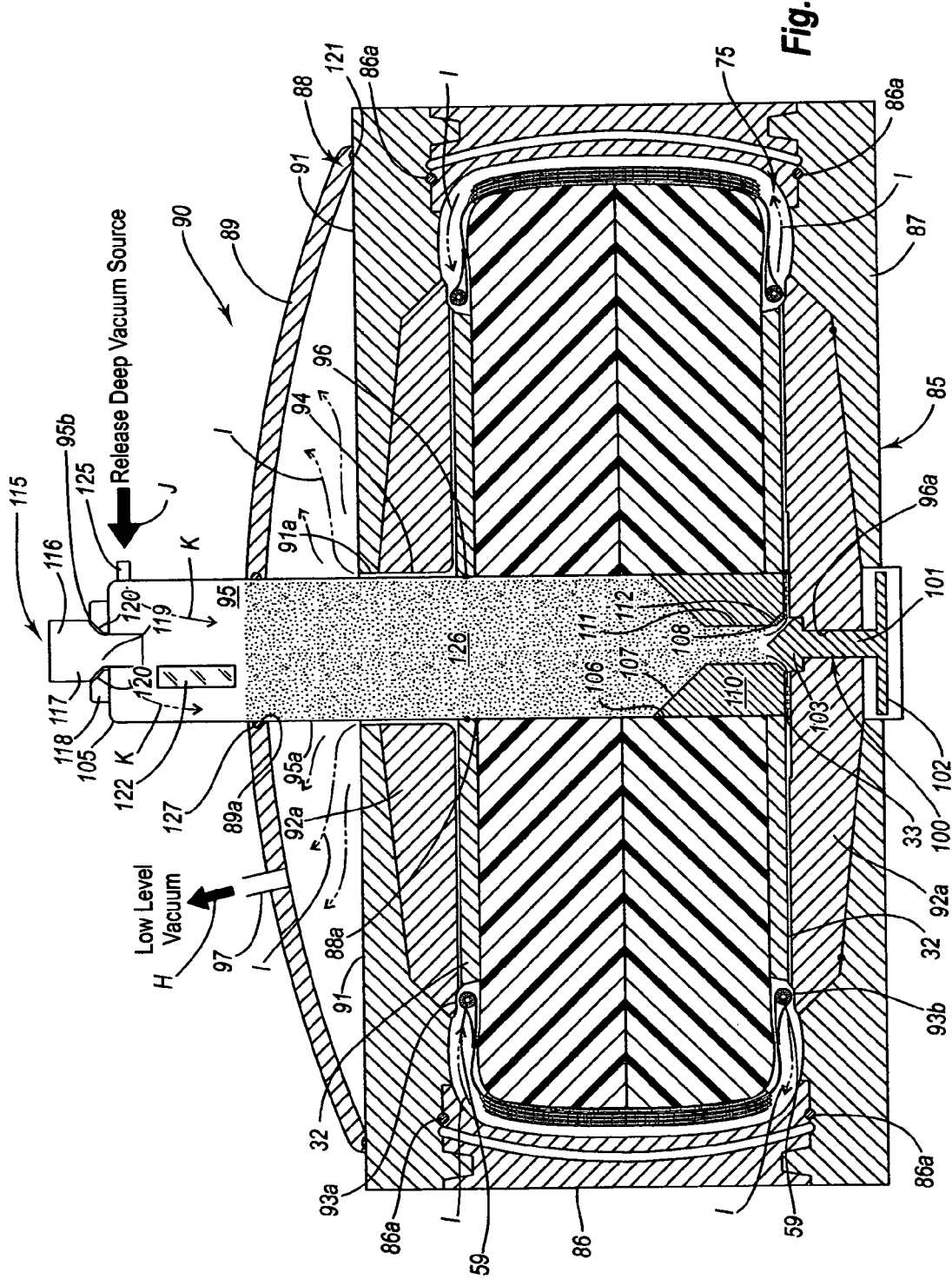
FIG. 9C is a view like that of FIG. 9B, only showing the pouring head closed, with the elastomeric material sans air contained in the deep vacuum canister and with the canister port shown as open, admitting ambient air, arrow K, into the canister, and showing the needle valve at the bottom of the canister as just opening, passing a flow of the elastomeric material therefrom, pushing air ahead of the flow of elastomeric material, shown as arrows I, that is pulled by the low level vacuum, arrow H.

FIG. 9C is a view like that of FIG. 9B and additionally shows a desired volume of elastomeric material mix as having been poured into the cylindrical canister 95. Whereafter, the high level vacuum is removed from the canister port 125 that is opened to atmosphere, illustrated by arrow J, allowing an inlet air flow shown as arrows K, in through the canister port 125. At which port 125 opening, the needle valve is opened, allowing for a flow of the elastomeric material mix 126, that has had essentially all the air removed therefrom, to flow across the inverted cone shaped end 103 of the needle valve 100. Which elastomeric material mix 126 flow is shown as just proceeding out from the nozzle end 108 and passing under the plug 110 and above the surface of the top of the bottom bead alignment plate 92b, to flow into the annular mold cavity and through the core 75 of plies, belts and beads therein, as shown in FIG. 9D.

Figure 9D:
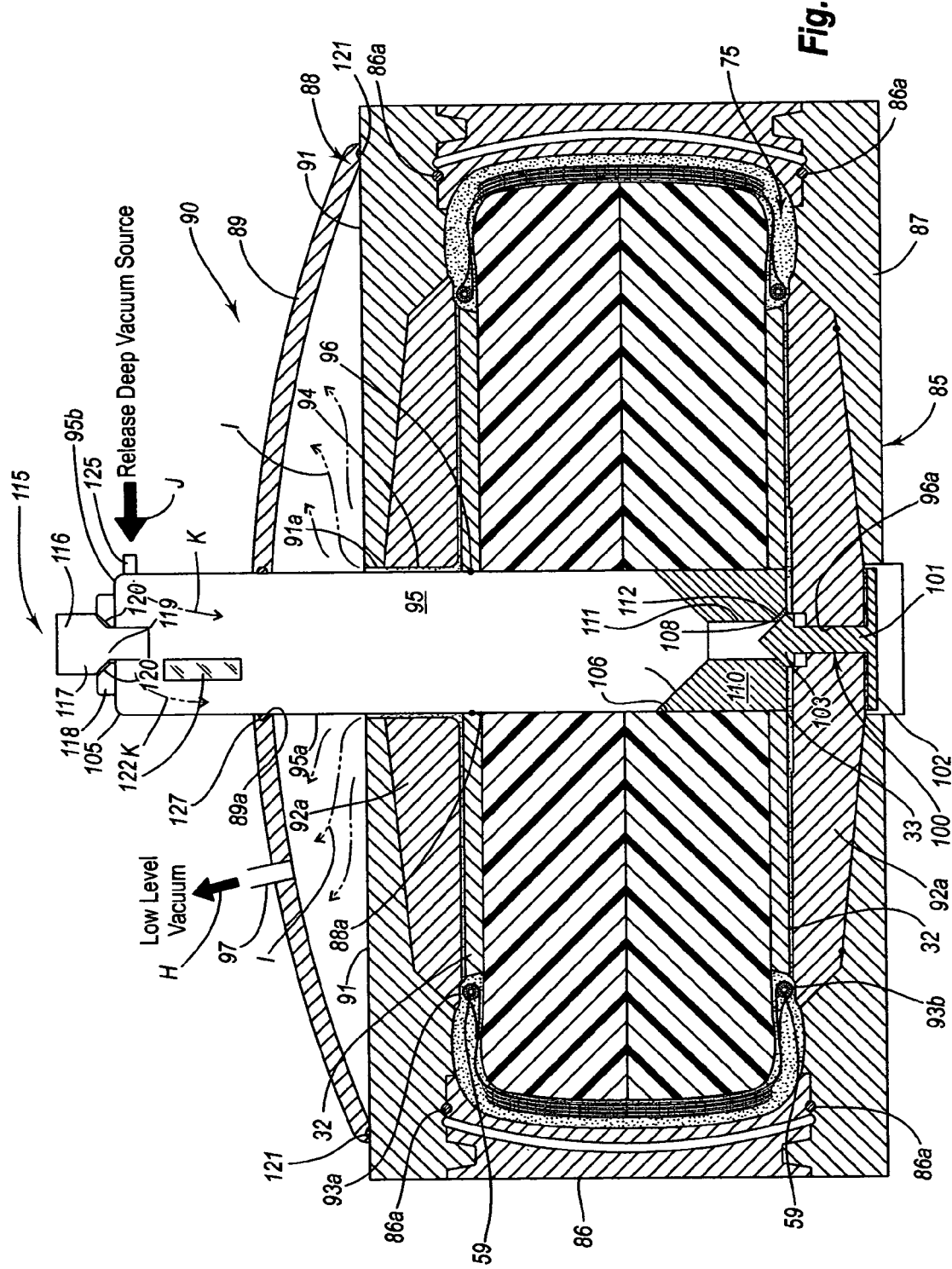
FIG. 9D is a view like that of FIG. 9C only showing most of the elastomeric material as having been evacuated from the deep vacuum canister, through the needle valve that has been closed, and showing the elastomeric material as having passed through and around core of plies, belts and beads and separator layers maintained on the inner mold mandrel, and with the elastomeric material shown as having passed up the canister side and just entering the area beneath the dome shaped cover, following the air flow, arrow I, out from the outer mold through cover port wherethrough is being pulled a low level vacuum, arrow H, completing the tire formation.

FIG. 9D is a view like that of FIG. 9C and additionally shows the elastomeric materials pour as having passed through the needle valve 100 and is distributed throughout the mold cavity that is the annular area between the inner and outer molds that contains the core 75 of plies, belts and beads, forming the transport tire 130, as shown in FIG. 11, and the needle valve 100 is closed prior to allowing air within the canister 95 to travel out of the nozzle end 108 across the surface of the needle valve head end 103. Which elastomeric material is shown as having filled the cavity and is just passing up along the space the cylindrical canister 95 outer surface 95a and the walls of the center openings 91a and 94 of the vacuum forming apparatus top plate 91 and the top bead alignment plate 92a, respectively. Which travel of the elastomeric material is in response to the low level vacuum, shown as arrow H, that is being pulled through the cover vacuum port 97, with air ahead of the elastomeric material flow, shown as arrows I, being pulled toward the cover port 97 and exhausting through the cover vacuum port 97. The cylindrical canister 95 port remains open, shown as arrow J, to ambient air during which elastomeric material flow through the cavity between the inner and outer molds as air is exhausted from beneath the cover 89 through the port 97. Whereafter, the cover 89 is lifted off of the outer mold top 88 and the outer mold is broken apart to remove the finished tire therefrom. Which finished tire is like the tire 130 shown in FIG. 11 that includes the core 75 of FIG. 10.

Figure 12:
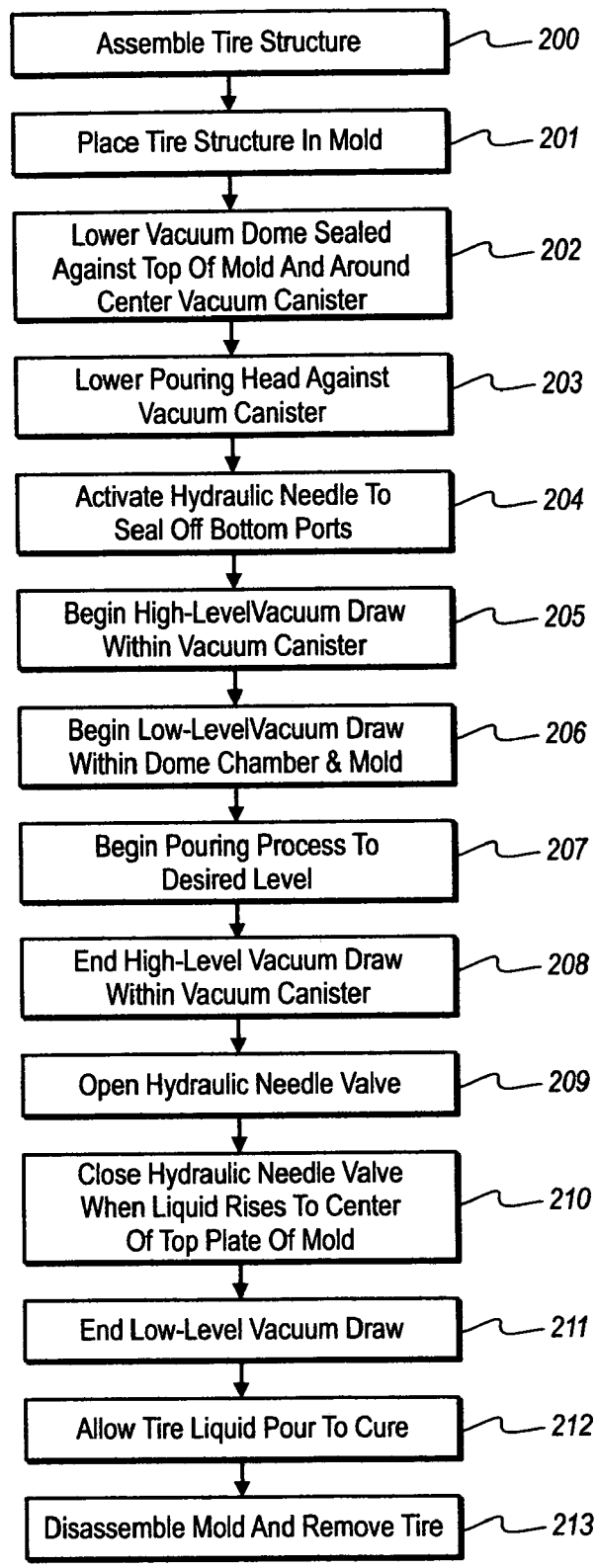
FIG. 12 shows a block flow schematic of the steps practiced to form a tire of FIGS. 10 and 11 utilizing the vacuum forming apparatus of the invention.

FIG. 12 shows a block flow schematic of a summary of the steps performed in forming an elastomeric tire utilizing the vacuum forming apparatus 90 as described above. Blocks 201 and 202 illustrate the formation of the core of plies, belts and beads on a mandrel component of a inner mold and the fitting of an outer mold thereto, forming a mold with the core occupying an annular area between the inner and outer molds. In which fitting together seals are positioned between the inner and outer mold segments to provide an air tight pathway through the annular area wherein the transport tire core 75 is maintained. For a vacuum forming apparatus 90, as illustrated by block 202 and described above, a dome shaped cover is fitted over the outer mold top surface, engaging seals therebetween and the cylindrical cannister is fitted into center opening through the cover and connected inner and outer molds, sealing to the cover hole edges and at the outer mold top, providing a flow path from a needle valve end of the canister into the annular area containing the core to exit alongside the cannister into the area under the cover. Illustrated by block 203, the pouring head has been fitted into the canister top end and, as illustrated by block 204, the tapered head end of the needle valve has been moved into sealing engagement with the end of the canister discharge tube sealing off flow therethrough. So arranged, as high vacuum that is at least ninety six (96) percent is pulled through a canister port, pulling air out from the canister, as illustrated by block 205, and a low level vacuum of at least eighty five (85) percent, and not greater than ninety five (95) percent, is pulled through a port through the cover, pulling air out from beneath the cover and the mold, as illustrate by block 206. Thereafter, an elastomeric material that has been recently mixed from constituents is poured through the canister top, as illustrated by block 207, with the high level vacuum to remove air from the elastomeric material mixture. When a desired volume or weight of elastomeric material has been poured into the canister, the high level vacuum is ended, as illustrated by block 208, and the canister is opened to atmosphere. Simultaneously to opening the canister to atmosphere the needle valve is opened, as illustrated by block 209, and the elastomeric material is passed into the mold annular area, traveling through the core, with the needle valve closed prior to a passage of air from the canister following the elastomeric material. An operator seeing elastomeric material venting from the mold top plate closes the needle valve, as illustrated by block 210, if it has not already been closed to prevent air passage, and ends the low vacuum draw through the cover port, as illustrated by block 211. The newly formed transport tire is allowed to cool and cure in the mold, as illustrated by block 212, and then the mold is broken open and the transport tire removed, as illustrated by block 213.

While preferred embodiments of our invention in a vacuum forming apparatus for forming a tire in a single operation, have been shown and described herein, it should be understood that variations and changes are possible to the apparatus and method for its use in the formation of the described tire, and the materials used, without departing from the subject matter coming within the scope of the following claims, and a reasonable equivalency thereof, which claims we regard as our invention.

We claim:

1. A vacuum forming apparatus for manufacturing a transport tire containing a core of plies, belts and beads from an elastomeric material comprising, a mold formed from an inner mold that includes a mandrel whereon a transport tire core of plies, belt and beads are laid-up on, with said core maintained in an annular area of said mold between said inner mold and an outer mold that is arranged for mounting to said inner mold; means for sealing said mold annular area from an air flow from outside of said mold; a canister that is fitted through the center of the joined inner and outer molds and open through its top to pass a flow of a mixture of elastomeric material constituents and that has a valve means fitted into the lower end of said canister for providing a controlled flow therefrom of said elastomeric material constituents into said mold annular area where said core of plies, belt and beads is positioned; passage means from said valve means into said annular area between said inner mold and outer mold; a first port means mounted into said canister for connection to a high level vacuum source for pulling air therethrough; a cover arranged for mounting onto said outer mold that has an open interior area that is connected to receive a flow from said annular area; and a second port means mounted into said cover for connection to a low level vacuum source.

2. The vacuum forming apparatus as recited in claim 1, wherein the canister is a cylinder that is fitted through the center of the joined inner and outer molds, with said cylinder open at its top end to receive a pouring head fitted therein that is open to pass the flow of the mixture of elastomeric components and wherein said cylinder slopes inwardly at its lower end into a tube having an open end as a seat for a needle valve tapered head, with said seat and needle valve tapered head constituting the valve means for providing the controlled flow of the elastomeric material constituents therefrom into the mold annular area.

3. The vacuum forming apparatus as recited in claim 2, wherein the needle valve, in addition to the tapered head, includes a stem having a flat end that is opposite to its tapered head that is contacted by a piston means for moving said flat end, stem and tapered head up and down and opens into a hole formed through a bottom bead alignment plate that is mounted across the bottom of the inner mold and has an edge for positioning under a bottom bead of the core.

4. The vacuum forming apparatus as recited in claim 3, further including a top bead alignment plate that is mounted across the top of the inner mold and also includes an edge for positioning above a top bead of the core.

5. The vacuum forming apparatus as recited in claim 2, wherein the cover is formed to have a dome shape with an open interior area under the cover, is for fitting across the outer mold top surface and includes a seal arranged between said cover edge and said outer mold top surface, and the cylindrical canister is fitted through a cover center hole and includes a seal arranged between an edge of said cover center hole and the outer surface of said cylindrical canister.

6. The vacuum forming apparatus as recited in claim 4, wherein the passage means is open from the needle valve, across the bottom bead alignment plate, around the inner mold mandrel whereon the core is laid-up and across the top bead alignment plate to vent along the outer surface of the cylindrical canister into the open area under the cover.

7. The vacuum forming apparatus as recited in claim 1, wherein the canister includes a sight glass fitted in the side thereof; and the first port means is an open tube that extends out from a top end of said canister.

8. The vacuum forming apparatus as recited in claim 1, wherein the second port means is an open tube that extends outwardly from the cover.

* * * * *